(12) United States Patent
Herb et al.

(10) Patent No.: US 7,038,655 B2
(45) Date of Patent: May 2, 2006

(54) ELECTROPHORETIC INK COMPOSED OF PARTICLES WITH FIELD DEPENDENT MOBILITIES

(75) Inventors: Craig A. Herb, Medford, MA (US); Libing Zhang, Sharon, MA (US)

(73) Assignee: E Ink Corporation, Cambridge, MA (US)

( * ) Notice: Subject to any disclaimer, the term of this patent is extended or adjusted under 35 U.S.C. 154(b) by 286 days.

(21) Appl. No.: 10/298,468

(22) Filed: Nov. 18, 2002

(65) Prior Publication Data
US 2003/0132908 A1    Jul. 17, 2003

Related U.S. Application Data

(63) Continuation-in-part of application No. 09/564,125, filed on May 3, 2000, now Pat. No. 6,693,620.

(60) Provisional application No. 60/132,303, filed on May 3, 1999.

(51) Int. Cl.
*G09G 3/34* (2006.01)
(52) U.S. Cl. .................... 345/107; 345/108
(58) Field of Classification Search ............. 345/84, 345/87, 95, 97, 107, 108, 210; 359/240, 359/252, 267, 296, 443; 264/1.36; 430/32; 257/66; 428/690; 313/498
See application file for complete search history.

(56) References Cited

U.S. PATENT DOCUMENTS

| | | |
|---|---|---|
| 2,800,457 A | 7/1957 | Green et al. |
| 3,036,388 A | 5/1962 | Tate |
| 3,384,488 A | 5/1968 | Tulagin et al. |
| 3,406,363 A | 10/1968 | Tate |
| 3,460,248 A | 8/1969 | Tate |
| 3,585,381 A | 6/1971 | Hodson et al. |
| 3,612,758 A | 10/1971 | Evans et al. |
| 3,668,106 A | 6/1972 | Ota |
| 3,670,323 A | 6/1972 | Sobel et al. |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,806,893 A | 4/1974 | Ohnishi et al. |

(Continued)

FOREIGN PATENT DOCUMENTS

EP    0 186 710 A1    7/1986

(Continued)

OTHER PUBLICATIONS

Gutcho, "Capsule Wall Treatment," *Microcapsules and Microencapsulation Techniques*, 1976, pp. 156-177.

(Continued)

*Primary Examiner*—Vijay Shankar
*Assistant Examiner*—Prabodh Dharia
(74) *Attorney, Agent, or Firm*—David J. Cole

(57) ABSTRACT

An electrophoretic display has a viewing surface, and includes an image pixel. The image pixel includes a first plurality of particles having a first mobility, and a second plurality of particles having a second mobility. At a first addressing voltage, the first mobility is greater than the second mobility. At a second addressing voltage, the second mobility is greater than the first mobility. At least one of the first and second mobilities is a variable function of voltage, i.e., a function of an applied electric field. Application of the first addressing voltage produces a first optical state, which is determined by a motion of the first plurality of particles. Application of the second addressing voltage produces a second optical state determined by a motion of the second plurality of particles.

21 Claims, 21 Drawing Sheets

U.S. PATENT DOCUMENTS

| | | |
|---|---|---|
| 3,850,627 A | 11/1974 | Wells et al. |
| 3,870,517 A | 3/1975 | Ota et al. |
| 3,892,568 A | 7/1975 | Ota |
| 3,909,116 A | 9/1975 | Kohashi |
| 3,922,255 A | 11/1975 | Koestler et al. |
| 4,001,140 A | 1/1977 | Foris et al. |
| 4,041,481 A | 8/1977 | Sato |
| 4,045,327 A | 8/1977 | Noma et al. |
| 4,062,009 A | 12/1977 | Raverdy et al. |
| 4,068,927 A | 1/1978 | White |
| 4,071,430 A | 1/1978 | Liebert |
| 4,087,376 A | 5/1978 | Foris et al. |
| 4,088,395 A | 5/1978 | Giglia |
| 4,093,534 A | 6/1978 | Carter et al. |
| 4,104,520 A | 8/1978 | Lewis et al. |
| 4,123,346 A | 10/1978 | Ploix |
| 4,126,528 A | 11/1978 | Chiang |
| 4,126,854 A | 11/1978 | Sheridon |
| 4,143,103 A | 3/1979 | Sheridon |
| 4,143,472 A | 3/1979 | Murata et al. |
| 4,147,932 A | 4/1979 | Lewis |
| 4,149,149 A | 4/1979 | Miki et al. |
| 4,166,800 A | 9/1979 | Fong |
| 4,196,437 A | 4/1980 | Hertz |
| 4,201,691 A | 5/1980 | Asher et al. |
| 4,203,106 A | 5/1980 | Dalisa et al. |
| 4,211,668 A | 7/1980 | Tate |
| 4,218,302 A | 8/1980 | Dalisa et al. |
| 4,231,641 A | 11/1980 | Randin |
| 4,261,653 A | 4/1981 | Goodrich |
| 4,272,596 A | 6/1981 | Harbour et al. |
| 4,273,672 A | 6/1981 | Vassiliades |
| 4,285,801 A | 8/1981 | Chiang |
| 4,287,337 A | 9/1981 | Guglielmetti et al. |
| 4,298,448 A | 11/1981 | Müller et al. |
| 4,305,807 A | 12/1981 | Somlyody |
| 4,311,361 A | 1/1982 | Somlyody |
| 4,314,013 A | 2/1982 | Chang |
| 4,324,456 A | 4/1982 | Dalisa |
| 4,368,952 A | 1/1983 | Murata et al. |
| 4,390,403 A | 6/1983 | Batchelder |
| 4,418,346 A | 11/1983 | Batchelder |
| 4,419,383 A | 12/1983 | Lee |
| 4,438,160 A | 3/1984 | Ishikawa et al. |
| 4,439,507 A | 3/1984 | Pan et al. |
| 4,444,961 A | 4/1984 | Timm |
| 4,450,440 A | 5/1984 | White |
| 4,502,934 A | 3/1985 | Gazard et al. |
| 4,522,472 A | 6/1985 | Liebert et al. |
| 4,543,306 A | 9/1985 | Dubois et al. |
| 4,605,284 A | 8/1986 | Fergason |
| 4,620,916 A | 11/1986 | Zwemer et al. |
| 4,623,706 A | 11/1986 | Timm et al. |
| 4,643,528 A | 2/1987 | Bell, Jr. |
| 4,648,956 A | 3/1987 | Marshall et al. |
| 4,655,897 A | 4/1987 | DiSanto et al. |
| 4,666,673 A | 5/1987 | Timm |
| 4,707,080 A | 11/1987 | Fergason |
| 4,732,830 A | 3/1988 | DiSanto et al. |
| 4,742,345 A | 5/1988 | DiSanto et al. |
| 4,746,917 A | 5/1988 | DiSanto et al. |
| 4,748,366 A | 5/1988 | Taylor |
| 4,833,464 A | 5/1989 | DiSanto et al. |
| 4,889,603 A | 12/1989 | DiSanto et al. |
| 4,891,245 A | 1/1990 | Micale |
| 4,909,959 A | 3/1990 | Lemaire et al. |
| 4,919,521 A | 4/1990 | Tada et al. |
| 4,931,019 A | 6/1990 | Park |
| 4,947,219 A | 8/1990 | Boehm |
| 5,009,490 A | 4/1991 | Kouno et al. |
| 5,017,225 A | 5/1991 | Nakanishi et al. |
| 5,041,824 A | 8/1991 | DiSanto et al. |
| 5,053,763 A | 10/1991 | DiSanto et al. |
| 5,057,363 A | 10/1991 | Nakanishi |
| 5,059,694 A | 10/1991 | Delabouglise et al. |
| 5,066,105 A | 11/1991 | Yoshimoto et al. |
| 5,066,559 A | 11/1991 | Elmasry et al. |
| 5,066,946 A | 11/1991 | DiSanto et al. |
| 5,070,326 A | 12/1991 | Yoshimoto et al. |
| 5,077,157 A | 12/1991 | DiSanto et al. |
| 5,082,351 A | 1/1992 | Fergason |
| 5,099,256 A | 3/1992 | Anderson |
| 5,105,185 A | 4/1992 | Nakanowatari et al. |
| 5,106,468 A * | 4/1992 | Chimenti .................... 204/564 |
| 5,128,226 A | 7/1992 | Hung |
| 5,128,785 A | 7/1992 | Yoshimoto et al. |
| 5,132,049 A | 7/1992 | Garreau et al. |
| 5,138,472 A | 8/1992 | Jones et al. |
| 5,149,826 A | 9/1992 | Delabouglise et al. |
| 5,151,032 A | 9/1992 | Igawa |
| 5,174,882 A | 12/1992 | DiSanto et al. |
| 5,177,476 A | 1/1993 | DiSanto et al. |
| 5,185,226 A | 2/1993 | Grosso et al. |
| 5,187,609 A | 2/1993 | DiSanto et al. |
| 5,204,424 A | 4/1993 | Roncali et al. |
| 5,216,416 A | 6/1993 | DiSanto et al. |
| 5,216,530 A | 6/1993 | Pearlman et al. |
| 5,223,115 A | 6/1993 | DiSanto et al. |
| 5,223,823 A | 6/1993 | DiSanto et al. |
| 5,233,459 A | 8/1993 | Bozler et al. |
| 5,247,290 A | 9/1993 | DiSanto et al. |
| 5,250,932 A | 10/1993 | Yoshimoto et al. |
| 5,250,938 A | 10/1993 | DiSanto et al. |
| 5,254,981 A | 10/1993 | DiSanto et al. |
| 5,262,098 A | 11/1993 | Crowley et al. |
| 5,266,098 A | 11/1993 | Chun et al. |
| 5,266,937 A | 11/1993 | DiSanto et al. |
| 5,268,448 A | 12/1993 | Buechner et al. |
| 5,270,843 A | 12/1993 | Wang |
| 5,272,238 A | 12/1993 | Garnier et al. |
| 5,276,113 A | 1/1994 | Hashiguchi et al. |
| 5,276,438 A | 1/1994 | DiSanto et al. |
| 5,279,511 A | 1/1994 | DiSanto et al. |
| 5,279,694 A | 1/1994 | DiSanto et al. |
| 5,293,528 A | 3/1994 | DiSanto et al. |
| 5,296,974 A | 3/1994 | Tada et al. |
| 5,298,833 A | 3/1994 | Hou |
| 5,302,235 A | 4/1994 | DiSanto et al. |
| 5,303,073 A | 4/1994 | Shirota et al. |
| 5,304,439 A | 4/1994 | DiSanto et al. |
| 5,315,312 A | 5/1994 | DiSanto et al. |
| 5,326,484 A | 7/1994 | Nakashima et al. |
| 5,344,594 A | 9/1994 | Sheridon |
| 5,359,346 A | 10/1994 | DiSanto et al. |
| 5,360,689 A | 11/1994 | Hou et al. |
| 5,380,362 A | 1/1995 | Schubert |
| 5,383,008 A | 1/1995 | Sheridon |
| 5,389,945 A | 2/1995 | Sheridon |
| 5,402,145 A | 3/1995 | DiSanto et al. |
| 5,403,518 A | 4/1995 | Schubert |
| 5,411,398 A | 5/1995 | Nakanishi et al. |
| 5,411,656 A | 5/1995 | Schubert |
| 5,421,926 A | 6/1995 | Yukinobu et al. |
| 5,463,492 A | 10/1995 | Check |
| 5,467,107 A | 11/1995 | DiSanto et al. |
| 5,498,674 A | 3/1996 | Hou et al. |
| 5,508,068 A | 4/1996 | Nakano |
| 5,512,162 A | 4/1996 | Sachs et al. |
| 5,528,399 A | 6/1996 | Izumi et al. |
| 5,543,177 A | 8/1996 | Morrison et al. |
| 5,543,219 A | 8/1996 | Elwakil |
| 5,552,679 A | 9/1996 | Murasko |
| 5,556,583 A | 9/1996 | Tashiro |
| 5,561,443 A | 10/1996 | DiSanto et al. |

| Patent No. | Date | Inventor |
|---|---|---|
| 5,565,885 A | 10/1996 | Tamanoi |
| 5,573,711 A | 11/1996 | Hou et al. |
| 5,582,700 A | 12/1996 | Bryning et al. |
| 5,583,675 A | 12/1996 | Yamada et al. |
| 5,597,889 A | 1/1997 | Takimoto et al. |
| 5,604,027 A | 2/1997 | Sheridon |
| 5,604,070 A | 2/1997 | Rao et al. |
| 5,610,455 A | 3/1997 | Allen et al. |
| 5,614,340 A | 3/1997 | Bugner et al. |
| 5,627,561 A | 5/1997 | Laspina et al. |
| 5,635,317 A | 6/1997 | Taniguchi et al. |
| 5,638,103 A | 6/1997 | Obata et al. |
| 5,639,914 A | 6/1997 | Tomiyama et al. |
| 5,643,506 A | 7/1997 | Rourke |
| 5,643,673 A | 7/1997 | Hou |
| 5,650,199 A | 7/1997 | Chang et al. |
| 5,650,247 A | 7/1997 | Taniguchi et al. |
| 5,650,872 A | 7/1997 | Saxe et al. |
| 5,654,367 A | 8/1997 | Takimoto et al. |
| 5,663,224 A | 9/1997 | Emmons et al. |
| 5,672,381 A | 9/1997 | Rajan |
| 5,673,148 A | 9/1997 | Morris et al. |
| 5,676,884 A | 10/1997 | Tiers et al. |
| 5,688,584 A | 11/1997 | Casson et al. |
| 5,691,098 A | 11/1997 | Busman et al. |
| 5,693,442 A | 12/1997 | Weiss et al. |
| 5,694,224 A | 12/1997 | Tai |
| 5,707,738 A | 1/1998 | Hou |
| 5,707,747 A | 1/1998 | Tomiyama et al. |
| 5,708,525 A | 1/1998 | Sheridon |
| 5,709,976 A | 1/1998 | Malhotra |
| 5,714,270 A | 2/1998 | Malhotra et al. |
| 5,715,511 A | 2/1998 | Aslam et al. |
| 5,716,550 A | 2/1998 | Gardner et al. |
| 5,717,283 A | 2/1998 | Biegelsen et al. |
| 5,717,514 A | 2/1998 | Sheridon |
| 5,717,515 A | 2/1998 | Sheridon |
| 5,725,935 A | 3/1998 | Rajan |
| 5,729,632 A | 3/1998 | Tai |
| 5,737,115 A | 4/1998 | Mackinlay et al. |
| 5,739,801 A | 4/1998 | Sheridon |
| 5,745,094 A | 4/1998 | Gordon, II et al. |
| 5,751,268 A | 5/1998 | Sheridon |
| 5,753,763 A | 5/1998 | Rao et al. |
| 5,754,332 A | 5/1998 | Crowley |
| 5,759,671 A | 6/1998 | Tanaka et al. |
| 5,760,761 A | 6/1998 | Sheridon |
| 5,767,826 A | 6/1998 | Sheridon et al. |
| 5,777,782 A | 7/1998 | Sheridon |
| 5,783,614 A | 7/1998 | Chen et al. |
| 5,808,783 A | 9/1998 | Crowley |
| 5,825,529 A | 10/1998 | Crowley |
| 5,828,432 A | 10/1998 | Shashidhar et al. |
| 5,843,259 A | 12/1998 | Narang et al. |
| 5,900,858 A | 5/1999 | Richley |
| 5,914,806 A | 6/1999 | Gordon, II et al. |
| 5,930,026 A | 7/1999 | Jacobson et al. |
| 5,961,804 A | 10/1999 | Jacobson et al. |
| 6,014,247 A | 1/2000 | Winter et al. |
| 6,064,784 A | 5/2000 | Whitehead et al. |
| 6,067,185 A * | 5/2000 | Albert et al. ................ 359/296 |
| 6,113,810 A | 9/2000 | Hou et al. |
| 6,117,294 A | 9/2000 | Rasmussen |
| 6,117,368 A | 9/2000 | Hou |
| 6,118,426 A * | 9/2000 | Albert et al. ................ 345/107 |
| 6,241,921 B1 * | 6/2001 | Jacobson et al. .......... 264/1.36 |
| 6,262,833 B1 * | 7/2001 | Loxley et al. .............. 359/296 |
| 6,327,024 B1 * | 12/2001 | Hayashi et al. ............ 355/53 |
| 6,392,786 B1 * | 5/2002 | Albert ........................ 359/296 |
| 6,531,997 B1 * | 3/2003 | Gates et al. ................ 345/107 |
| 6,577,433 B1 * | 6/2003 | Lin et al. .................... 359/296 |
| 6,683,333 B1 * | 1/2004 | Kazlas et al. .............. 257/197 |
| 6,693,620 B1 * | 2/2004 | Herb et al. .................. 345/107 |
| 6,704,133 B1 * | 3/2004 | Gates et al. ................ 359/296 |
| 6,816,146 B1 * | 11/2004 | Harada et al. .............. 345/107 |
| 2001/0005567 A1 * | 6/2001 | Harada et al. ................ 430/32 |
| 2002/0036616 A1 * | 3/2002 | Inoue ........................ 345/107 |
| 2002/0167480 A1 * | 11/2002 | Johnson et al. ............. 345/107 |
| 2003/0038772 A1 * | 2/2003 | De Boer et al. ............. 345/107 |
| 2004/0032390 A1 * | 2/2004 | Liang et al. ................ 345/107 |
| 2004/0119680 A1 * | 6/2004 | Daniel et al. ............... 345/107 |
| 2004/0150325 A1 * | 8/2004 | Yamakita et al. ........... 313/498 |
| 2005/0057803 A1 * | 3/2005 | Cruz-Uribe et al. ........ 359/443 |
| 2005/0079386 A1 * | 4/2005 | Brown et al. ............... 428/690 |
| 2005/0179036 A1 * | 8/2005 | Yamazaki et al. ............ 257/66 |

FOREIGN PATENT DOCUMENTS

| | | |
|---|---|---|
| EP | 0 323 656 B1 | 7/1987 |
| EP | 0 240 063 B1 | 10/1987 |
| EP | 0 268 877 A2 | 6/1988 |
| EP | 0 268 877 A3 | 6/1988 |
| EP | 0 281 204 A2 | 9/1988 |
| EP | 0 325 013 A1 | 7/1989 |
| EP | 0 325 013 B1 | 7/1989 |
| EP | 0 361 420 A2 | 4/1990 |
| EP | 0 375 005 B1 | 6/1990 |
| EP | 0 396 937 A2 | 11/1990 |
| EP | 0 404 545 A2 | 12/1990 |
| EP | 0 408 105 B1 | 1/1991 |
| EP | 0 442 123 A1 | 8/1991 |
| EP | 0 443 571 A2 | 8/1991 |
| EP | 0 525 852 A1 | 2/1993 |
| EP | 0 525 852 B1 | 2/1993 |
| EP | 0 540 281 A2 | 5/1993 |
| EP | 0 708 798 B1 | 5/1996 |
| EP | 0 709 713 A2 | 5/1996 |
| EP | 0 721 176 A2 | 7/1996 |
| EP | 0 721 176 A3 | 7/1996 |
| EP | 0 962 808 A2 | 12/1999 |
| EP | 1 024 540 A2 | 8/2000 |
| GB | 1 314 906 | 4/1973 |
| GB | 1 465 701 | 3/1977 |
| GB | 2 044 508 A | 10/1980 |
| GB | 2 292 119 A | 2/1996 |
| GB | 2 306 229 A | 4/1997 |
| GB | 2 324 273 A | 10/1998 |
| JP | 53-73098 | 6/1978 |
| JP | 54111368 | 8/1979 |
| JP | 55096922 | 7/1980 |
| JP | 60189731 | 9/1985 |
| JP | 60197565 | 10/1985 |
| JP | 62058222 | 3/1987 |
| JP | 62231930 | 10/1987 |
| JP | 62269124 | 11/1987 |
| JP | 62299824 | 12/1987 |
| JP | 64 86116 | 3/1989 |
| JP | 01086117 A | 3/1989 |
| JP | 01086118 A | 3/1989 |
| JP | 01142537 A | 6/1989 |
| JP | 01177517 | 7/1989 |
| JP | 01248182 A | 10/1989 |
| JP | 01267525 | 10/1989 |
| JP | 02223934 A | 9/1990 |
| JP | 02223935 A | 9/1990 |
| JP | 02223936 A | 9/1990 |
| JP | 02284124 A | 11/1990 |
| JP | 02284125 A | 11/1990 |
| JP | 3-053224 | 3/1991 |
| JP | 3-091722 | 4/1991 |
| JP | 3-096925 | 4/1991 |
| JP | 4-307523 | 10/1992 |
| JP | 04307512 A | 10/1992 |
| JP | 04345133 A | 12/1992 |
| JP | 5-61421 | 3/1993 |
| JP | 05165064 A | 6/1993 |

| | | |
|---|---|---|
| JP | 05173194 A | 7/1993 |
| JP | 05307197 A | 11/1993 |
| JP | 6089081 | 3/1994 |
| JP | 6-202168 | 7/1994 |
| JP | 2551783 | 8/1996 |
| JP | 08234176 | 9/1996 |
| JP | 9-6277 | 1/1997 |
| JP | 950181574 | 2/1997 |
| JP | 9-185087 | 7/1997 |
| JP | 9-211499 | 8/1997 |
| JP | 09230391 | 9/1997 |
| JP | 10-48673 | 2/1998 |
| JP | 10-149118 A | 6/1998 |
| JP | 10-161161 | 6/1998 |
| JP | 11212499 A | 8/1999 |
| JP | 11219135 A | 8/1999 |
| JP | 11237851 A | 8/1999 |
| JP | 11352526 | 12/1999 |
| WO | WO 82/02961 | 9/1982 |
| WO | WO 92/17873 | 10/1992 |
| WO | WO 94/24236 | 10/1994 |
| WO | WO 95/02636 | 1/1995 |
| WO | WO 95/05622 | 2/1995 |
| WO | WO 95/15363 | 6/1995 |
| WO | WO 95/19227 | 7/1995 |
| WO | WO 95/27924 | 10/1995 |
| WO | WO 95/33085 | 12/1995 |
| WO | WO 97/04398 | 2/1997 |
| WO | WO 97/24715 | 7/1997 |
| WO | WO 97/24907 | 7/1997 |
| WO | WO 98/03896 | 1/1998 |
| WO | WO 98/19208 | 5/1998 |
| WO | WO 98/41898 | 9/1998 |
| WO | WO 98/41899 | 9/1998 |
| WO | WO 98/58383 | 12/1998 |
| WO | WO 99/10767 | 3/1999 |
| WO | WO 99/10768 | 3/1999 |
| WO | WO 99/12170 | 3/1999 |
| WO | WO 99/26419 | 5/1999 |
| WO | WO 99/47970 | 9/1999 |
| WO | WO 99/56171 | 11/1999 |
| WO | WO 99/65011 | 12/1999 |
| WO | WO 99/65012 | 12/1999 |
| WO | WO 00/10048 | 2/2000 |

OTHER PUBLICATIONS

Sankus, J., "Electrophoretic Display Cell," *Xerox Disclosure Journal*, May/Jun. 1979, vol. 4, No. 3, p. 309.

Gutcho, "Microencapsulation with Synthetic Polymeric Film Formers," *Microcapsules and Microencapsulation Techniques*, 1976, pp. 65-130.

Gutcho, "Pigments and Paints," *Microcapsules and Microencapsulation Techniques*, 1976, pp. 178-193.

Ballinger et al., "Magnetic Recording Paper is Erasable," *Electronics*, Mar. 1, 1973, pp. 73-76.

Beilin et al., "2000-Character Electrophoretic Display," *SID 86 Digest*, 1986, pp. 136-140.

Blazo, S.F., "10.1/9:00 A.M.: High Resolution Electrophoretic Display with Photoconductor Addressing," *SID 82 Digest*, 1982, pp. 92-93.

Bohnke et al., "Polymer-Based Solid Electrochromic Cell for Matrix-Addressable Display Devices," *J. Electrochem Soc.*, 1991, vol. 138, No. 12, pp. 3612-3617.

Bryce, "Seeing Through Synthetic Metals," *Nature*, 1988, vol. 335, No. 1, pp. 12-13.

Chiang, "Conduction Mechanism of Charge Control Agents Used in Electrophretic Display Devices," *Proceedings of the S.I.D.*, 1977, vol. 18, Nos. 3 & 4, pp. 275-282.

Chiang et al., "A High Speed Electrophoretic Matrix Display," *SID 80 Digest*, 1980, pp. 114-115.

Comiskey et al., "Electrophoretic Ink: A Printable Display Material," *SID 97 Digest*, 1997, pp. 75-76.

Croucher et al., "Electrophoretic Display: Materials as Related to Performance," *Photographic Science and Engineering*, 1981, vol. 25, No. 2, pp. 80-86.

Dalisa, "Electrophoretic Display Technology," *Transactions on Electron Devices*, 1977, vol. 24, No. 7, pp. 827-834.

Egashira et al., "A Solid Electrochromic Cell Consisting of LU-Diphthalocyanine and Lead Fluoride," *Proceedings of the SID*, 1987, vol. 28, No. 3, pp. 227-232.

Fitzhenry, "Optical Effects of Adsorption of Dyes on Pigment Used in Electrophoretic Image Displays," *Applied Optics*, 1979, vol. 18, No. 19, pp. 3332-3337.

Fitzhenry, "Optical Properties of Electrophoretic Image Displays," *Proceedings of the SID*, 1981, vol. 22, No. 4, pp. 300-309.

Goodman, "Passive Liquid Displays: Liquid Crystals, Electrophoretics, and Electrochromics," *Proceeding of the SID*, 1976, vol. 17, No. 1, pp. 30-38.

Gutcho, "Additional Uses for Encapsulated Products," *Microcapsules and Microencapsulation Techniques*, 1976, pp. 307-312.

Hatano et al., "Bistable Paper-White Display Device Using Cholesteric Liquid Crystals," *SID 96 Digest*, 1996, pp. 269-272.

Ji et al., "P-50: Polymer Walls in Higher-Polymer-Content Bistable Reflective Cholesteric Displays," *SID 96 Digest*, 1996, pp. 611-613.

Jin et al., "Optically Transparent, Electrically Conductive Composite Medium," *Science*, 1992, pp. 446-448.

Lee, L., "Fabrication of Magnetic Particles Display," *Proceedings of the SID*, 1977, vol. 18, Nos. 3 & 4, pp. 283-288.

Lewis et al., "Gravitational, Inter-Particle and Particle-Electrode Forces in the Electrophoretic Display," *Proceeding of the SID*, 1977, vol. 18, Nos. 3 & 4, pp. 235-242.

Mürau et al., "The Understanding and Elimination of Some Suspension Instabilities in an Electrophoretic Display," *J. Appl. Phys.*, 1978, vol. 49, No. 9, pp. 4820-4829.

Mürau et al., "An Electrophoretic Radiographic Device," *SID 79 Digest*, 1979, pp. 46-47.

Vaz et al., "Dual Frequency Addressing of Polymer-Dispensed Liquid-Crystal Films," *Journal of Applied Physics*, Jun. 1989, vol. 65, No. 12, pp. 5043-5049.

Ota et al., "Developments in Electrophoretic Displays," *Proceedings of the SID*, 1977, vol. 18, Nos. 3 & 4, pp. 243-254.

Ota et al., "Electrophoretic Display Devices," *Laser 75 Optoelectronics Conference Proceedings*, pp. 145-148.

Ota et al., "Electrophoretic Image Display (EPID) Panel," *Proceedings of the IEEE*, 1973, pp. 1-5.

Pankove, J., "Color Reflection Type Display Panel," *RCA Technical Notes*, 1962, No. 535: 2.

Pearlstein, F., "Electroless Plating," *Modern Electroplating*, pp. 710-747.

Saitoh, M. et al., "A Newly Developed Electrical Twisting Ball Display," *Proceedings of the SID*, 1982 vol. 23, No. 4, pp. 249-253.

Sheridon et al., "The Gyricon—A Twisting Ball Display," *Proceeding of the SID*, 1977, vol. 18, Nos. 3 & 4, pp. 289-293.

Shiffman, R.R. et al., "An Electrophoretic Image Display with Internal NMOS Address Logic and Display Drivers," *Proceedings of the SID*, 1984, vol. 25, No. 2, pp. 105-115.

Shiwa, S. et al., "5.6 Electrophoretic Display Method Using Ionographic Technology," *SID 88 Digest*, 1988, pp. 61-62.

Singer, B. et al., "An X-Y Addressable Electrophoretic Display," *Proceeding of the SID*, 1977, vol. 18, Nos. 3 & 4, pp. 255-266.

"Electronic Book is a Whole Library," *The Sunday Times, Book Review*, Feb. 25, 1996.

Vance, "Optical Characteristics of Electrophoretic Displays," *Proceeding of the SID*, 1977, vol. 18, Nos. 3 & 4, pp. 267-274.

Yamaguchi, M. et al., "Equivalent Circuit of Ion Projection-Driven Electrophoretic Display," *IEICE Transactions*, 1991, vol. 74, No. 12, pp. 4152-4156.

Yang et al., "A New Architecture for Polymer Transistors," *Nature*, 1994, vol. 372, pp. 344-346.

Zollinger, "Structure of Simple Di-and Triarylmethine Dyes and Their Aza Analogues," *Color Chemistry, Synthesis, Properties and Applications of Organic Dyes and Pigments*, 2nd, Rev. Edition, VCH, Weinheim, 1991, pp. 73.

"Electronic Ink' Sign Debuts at JCPenny," *Boston Globe*, May 4, 1999, p. C9.

Flaherty, J., "What Did Disappearing Ink Grow Up to Be? Electronic Ink," *The New York Times*, May 6, 1999.

Negroponte & Jacobson, "Surfaces and Displays," *Wired*, Jan. 1997, p. 212.

Comiskey, B. et al., "An Electrophoretic Ink for All-Printed Reflective Electronic Displays," *Nature*, Jul. 16, 1998, vol. 394, pp. 253-255.

Zurer, P., "Digital Ink Brings Electronic Books Closer," *Chemical*, Jul. 20, 1998, pp. 12-13.

Peterson, I., "Rethinking Ink. Printing the Pages of an Electronic Book," *Science News*, Jun. 20, 1998, vol., 153, pp. 396-397.

Guernsey L., "Beyond Neon: Electronic Ink," *New York Times*, B11, Col. 3, Jun. 3, 1999, p. 11.

White, R., "An Electrophoretic Bar Graph Display," *Proceedings of the SID*, 1981, vol. 22 No. 3, pp. 173-180.

Pansu et al., "Structures of Thin Layers of Hard Spheres: High Pressure Limit," *J. Physique*, Feb. 1984, vol. 45, pp. 331-339.

Peiranski et al. (1983), "Thin Colloidal Crystals," *Physical Review Letters*, Mar. 21, 1983, vol. 50, No. 12, pp. 900-903.

Pansu et al., "Thin Colloidal Crystals: A Series of Structural Transitions," *J. Physique*, Apr. 1983, vol. 44, pp. 531-536.

Van Winkle et al., "Layering Transitions in Colloidal Crystals as Observed by Diffraction and Direct-Lattice Imaging", *Physical Review*, Jul. 1986, vol. 34, No. 1, pp. 562-573.

Chiang, "A Stylus Writable Electrophoretic Display Device," *SID 79 Digest*, pp. 44-45.

Nakamura et al., "Development of Electrophoretic Display Using Microencapsulated Suspension," *1998 SID International Symposium Digest of Technical Papers—vol. 29, Proceedings of SID '98 International Symposium, Anaheim, CA, USA*, May 1998, pp. 1014-1017.

Ridley et al., "All-Inorganic Field Effect Transistors Fabricated by Printing," *Science*, Oct. 22, 1999, vol. 286, pp. 746-748.

Dabbousi et al., "Electroluminescence from CdSe Quantum-Dot/Polymer Composites," *Appl. Phys. Lett.*, Mar. 1995, vol. 66, No. 11, pp. 1316-1318.

Huang et al., "Photoluminescence and Electroluminescence of ZnS:Cu Nanocrystals in Polymeric Networks," *Appl. Phys. Lett.*, May 5, 1997, vol. 70, No. 18, pp. 2335-2337.

Vandegaer, Jan E., "Microencapsulation: Processes and Applications ed.," *American Chemcial Society Symposium*, Chicago, IL, 1973, pp. v-x, 1-180 (published by Plenum Press, New York, 1974).

Drzaic et al., "A Printed and Rollable Bistable Electronic Display," *1998 SID International Symposium, Digest of Technical Papers*, 1998, vol. 29, pp. 1131-1134.

Shimoda et al., "Multicolor Pixel Patterning of Light-Emitting Polymers by Ink-Jet Printing," *SID 99 Digest*, May 1999, pp. 377-379.

Nakabu, S. et al., "The Development of Super-High Aperture Ratio With Low-Electrically Resistive Material for High-Resolution TFT-LCD's," *SID 99 Digest*, pp. 732-735.

Luckham, P.F. et al., "The Controlled Flocculation of Particulate Dispersion Using Small Particles of Opposite Charge. II. Investigation of Floc Structure Using a Freeze-Fracture Technique," *Colloids and Surfaces*, 1983, vol. 6, pp. 83-95.

Luckham, P.F. et al., "The Controlled Flocculation of Particulate Dispersion Using Small Particles of Opposite Charge. III. Investigation of Floc Structure Using a Freeze-Fracture Technique," *Colloids and Surfaces*, 1983, vol. 6, pp. 101-118.

Vincent, B. et al., "Adsorption of Small, Positive Particles onto Large, Negative Particles in the Presence of Polymer," *J.C.S. Faraday 1*, 1980, vol. 76, pp. 665-673.

Lee, L., "A Magnetic-Particles Display," *Proc. Soc. Inf. Disp. (USA)*, 1975, vol. 16, No. 3, pp. 177-184.

* cited by examiner

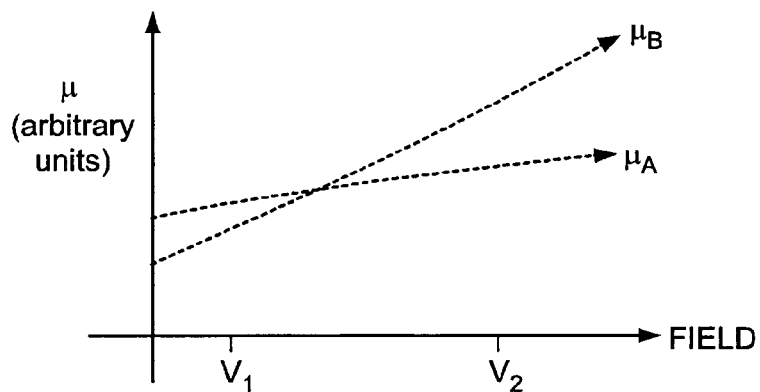
FIG. 16A
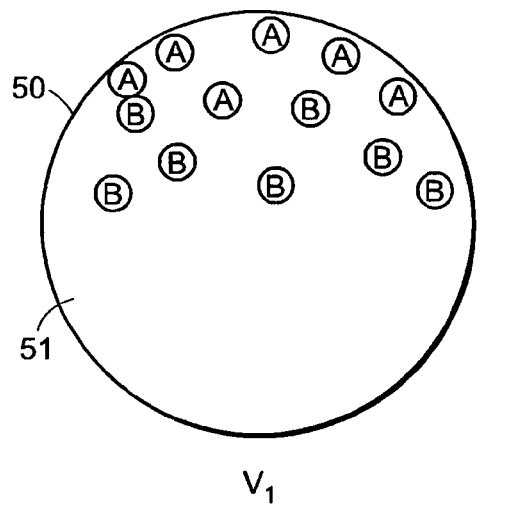 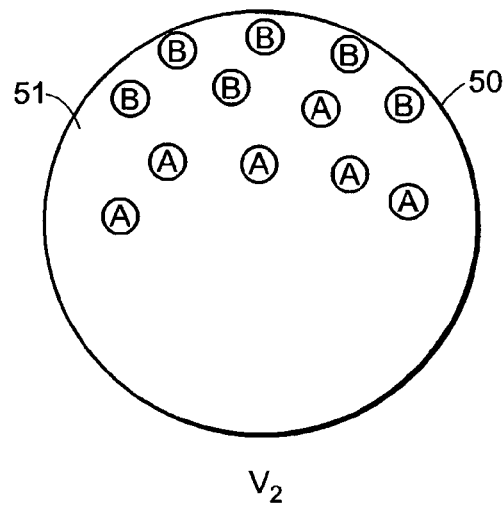
FIG. 16B      FIG. 16C

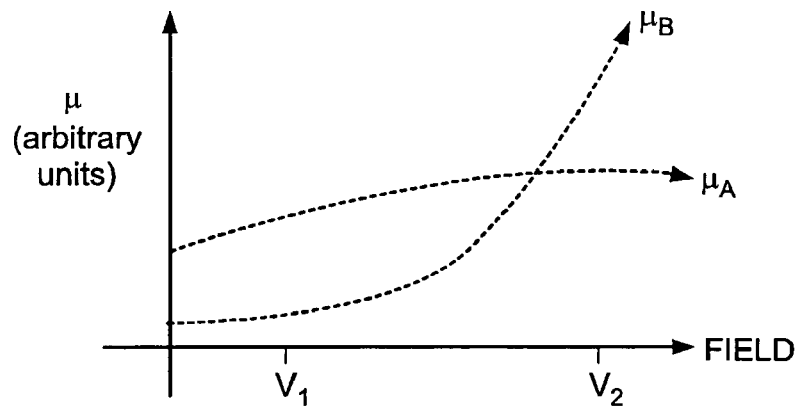
FIG. 19A
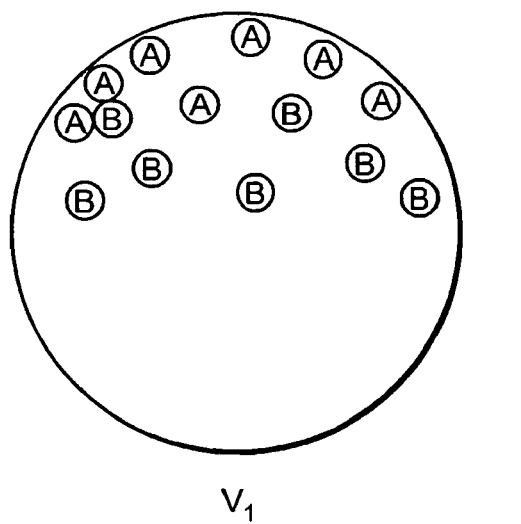 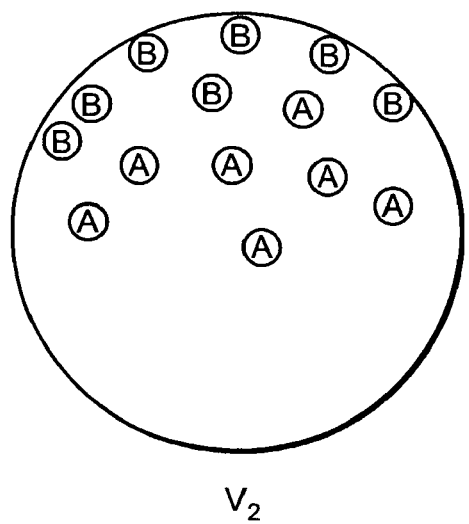
FIG. 19B	FIG. 19C

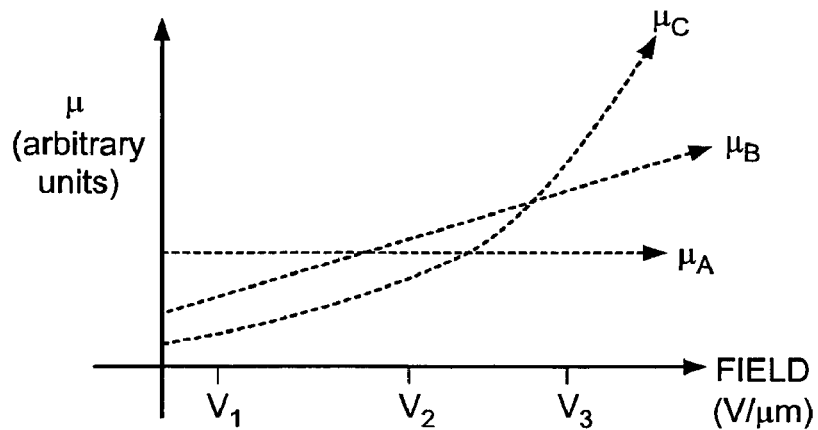
FIG. 20A
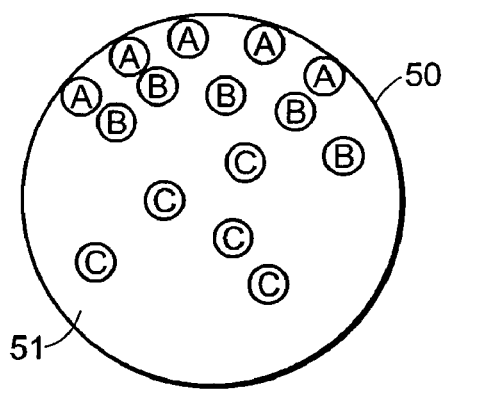 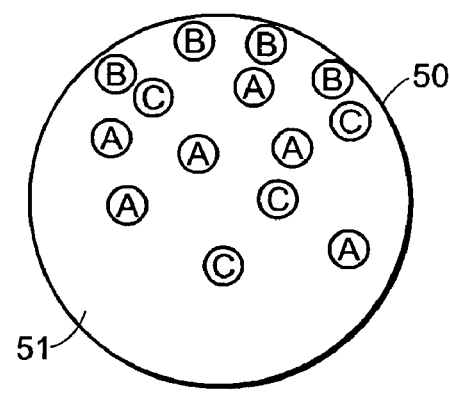
FIG. 20B  FIG. 20C
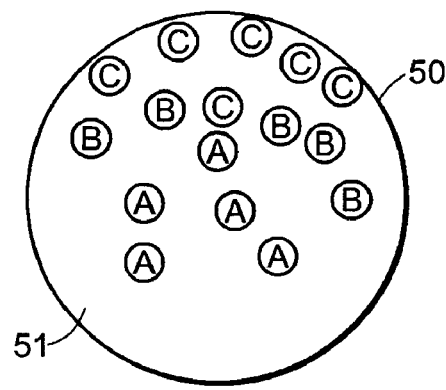
FIG. 20D

ELECTROPHORETIC INK COMPOSED OF PARTICLES WITH FIELD DEPENDENT MOBILITIES

CROSS-REFERENCE TO RELATED APPLICATION

The present application is a continuation-in-part of U.S. patent application Ser. No. 09/564,125, filed May 3, 2000 now U.S. Pat. No. 6,693,620, which claimed priority to and benefit of U.S. provisional patent application Ser. No. 60/132,303, filed May 3, 1999. The entire disclosures of those two applications are incorporated herein by reference.

TECHNICAL FIELD

The invention relates to electronic image displays. More particularly, the invention relates to materials, designs and methods for providing electrophoretic color and grey-level image displays.

BACKGROUND OF THE INVENTION

In an electrophoretic display, charged particles in a display medium move in response to an applied electric field. This movement produces display states that vary with the location of the particles in the medium.

In a conventional electrophoretic color display, an image element that can produce different colors typically includes pixels that individually provide different colors. For example, there can be a red-producing pixel, a green-producing pixel and a blue-producing pixel, all included in a single image element to enable the image element to produce a range of colors. Similarly, a grey-level display typically would include multiple pixels, each with two optical states, such as black and white, to enable an image element to produce a range of grey-levels.

Each image pixel in an image element is individually addressed. The provision of address lines that address individual pixels at predetermined locations in a display can be quite complex and expensive. In color or grey-level displays, the necessity to address several pixels of different colors or grey-levels to enable a variable color or grey-level image element increases the complexity and expense of manufacture of such displays.

SUMMARY

The invention enables the production of color and grey-level electrophoretic displays having simpler design and manufacturing cost. In part, the invention provides electrophoretic display image pixels that can display a range of colors and/or grey levels. Addressing the image pixel with different voltages may cause the image pixel to display different colors or grey levels. Thus, for example, separate addressing of multiple image pixels of different colors in a single image element is not required to provide a color display.

A variable color or grey-level image pixel may include two or more types of electrophoretic particles. The particles may have different color and/or grey level. The single image pixel can act as a single image element in a color and/or grey level images by a display. The particles may be encapsulated, for example, within a membrane or within voids in a binder material. Each image pixel may include one or more capsules.

In preferred embodiments, at least one of two or more types of electrophoretic particles included in the image pixel have a mobility that varies with applied electric field. The mobility may vary, for example, due to a particle charge that varies with the applied field. The variable mobility of at least one set, i.e., type, of particles in an image pixel permits the optical state of the pixel to be changed by addressing the pixel with different voltages, i.e., electric fields.

A pixel, in which different sets of particles may determine the optical state of the pixel at different voltages, may be produced by including a least one set of variable mobility particles in the pixel. For example, at a lower voltage one set of particles may exhibit greater movement, while at a higher voltage, a different set of particles may exhibit a greater movement. These physical effects may be utilized to vary the optical state of the pixel by applying different addressing voltages to the pixel.

Various embodiments may include more than two types of particles in a single pixel. Individual capsules may each enclose the different types of particles. Hence, separate sets of addressing interconnect, each for a different color, are not required to support an image element of variable color and/or grey level. Rather, voltage variations may be used to obtain color and/or grey-level variations from an image element containing a single pixel.

Accordingly, in a first aspect, the invention involves an electrophoretic display having a viewing surface. The display includes an image pixel. An image element may include a single image pixel. The image element may be one of many image elements, which contribute to the production of an image by the display. The pixel may be addressed with an addressing voltage. An optical characteristic of the pixel, for example, a color and/or grey-level, may be changed by changing the addressing voltage.

The image pixel includes a first plurality of particles having a first mobility, $\mu_1(V)$ and a second plurality of particles having a second mobility, $\mu_2(V)$. At first and second addressing voltages, $V_1$ and $V_2$, $\mu_1(V_1)$ is greater than $\mu_2(V_1)$ and $\mu_2(V_2)$ is greater than $\mu_1(V_2)$. That is, at least one of the first and second mobilities is a variable function of voltage, that is, a function of an applied electric field.

Application of the first addressing voltage, $V_1$, produces a first optical state, which is determined by a motion of the first plurality of particles. Application of the second addressing voltage, $V_2$, produces a second optical state determined by a motion of the second plurality of particles.

The image pixel may further include a carrier medium, i.e., a suspending medium, in which the first plurality of particles and the second plurality of particles are disposed. The electrophoretic display may include an addressing voltage generator in electrical communication with the image pixel.

The image pixel may include a third plurality of particles having a third mobility, $\mu_3(V)$. A third optical state is determined by a motion of the third plurality of particles by application of a third addressing voltage, $V_3$. In this embodiment, the third mobility is greater than the first and second mobilities, at the third addressing voltage.

The first, second and third pluralities of particles respectively may have a first, a second and a third color to permit production of a color image by the electrophoretic display. For example, the different pluralities may each be red, green or blue.

The first, second and third pluralities of particles respectively may have a first, a second and a third grey level to permit display of at least three grey levels by the image element. For example, the different pluralities may each be white, black or an intermediate grey. Alternatively each plurality may be one of three different intermediate grey levels.

A carrier medium may, for example, be transparent, translucent or opaque. The medium may have a color or a grey level. The medium may contribute to an optical characteristic of the image pixel.

The image pixel may further include one or more capsules that encapsulate the carrier medium. A capsule may have a membrane that encapsulates carrier medium. The carrier medium may be encapsulated inside one or more voids in a binder material.

The optical states may be determined by a particle color and/or a particle grey level. An optical state may be determined by a carrier medium. The optical state determined by the carrier medium may be affected by a color of the carrier medium. For example, an observer of the image pixel may observe a color of one plurality of particles, if the particles are clustered near the viewing surface. If particles move away from the viewing surface, the observer may perceive, for example, a color of the carrier medium.

Particles may have a variable mobility due to several different mechanisms. For example, particle charge may vary with voltage. A varying particle charge will contribute to a varying electric field-induced force on the particle. Further, particles may have a variable mobility if they reside in a carrier medium with a variable viscosity.

A carrier medium may have a voltage-variable viscosity due to several mechanisms. For example, a carrier medium may have a viscosity that varies due to movement of particles in the medium. Further, a carrier medium may exhibit a viscosity change that is directly induced by an electric field.

The first plurality of particles may have a charge that is a function of voltage. The carrier medium may have a viscosity that is a function of a motion of the first plurality of particles. The carrier medium may have a viscosity that is a function of voltage.

The image pixel may include a third plurality of particles having a third mobility, $\mu_3(V)$. In one embodiment, the absolute value of $\mu_3(V)$, i.e., its magnitude, is less than the absolute value of both $\mu_1(V)$ and $\mu_2(V)$ for all voltages, V. A third optical state is produced by application of a third addressing voltage, $V_3$. The third addressing voltage causes a motion of the first and second pluralities of particles away from the viewing surface.

The third plurality of particles may dominate the viewing characteristics perceived by an observer of the display because the other particles have moved away from the viewing surface.

The third mobility may be a constant function of voltage. It may have a polarity that is the same as both a polarity of $\mu_1(V)$ and a polarity of $\mu_2(V)$, or it may have a polarity that is opposite to both the first and second polarities.

At a first addressing voltage, $V_1$, $S_1(V_1)>S_2(V_1)$, and at a second addressing voltage, $V_2$, $S_1(V_2)<S_2(V_2)$. Application of the first addressing voltage produces a first optical state determined by a motion of the first plurality of particles. Application of the second addressing voltage produces a second optical state determined by a motion of the second plurality of particles.

The first addressing voltage may cause the first plurality of particles to move toward the viewing surface or away from the viewing surface. The first plurality of particles may be viewed after application of the first addressing voltage. Alternatively, a different plurality of particles may be viewed, for example, if the first plurality of particles move away from the viewing surface. Alternatively, a carrier medium may be viewed.

The first plurality of particles may have a first color, the second plurality of particles a second color and the carrier medium a third color, to permit display of a color image by the electrophoretic display.

In a second aspect, the invention involves a method of forming an image in an electrophoretic display having a viewing surface. The method includes addressing an image pixel with a first addressing voltage, $V_1$. A first optical state is produced by $V_1$, and determined by a motion of a first plurality of particles having a first mobility, $\mu_1(V)$. The image pixel is further addressed with a second addressing voltage, $V_2$, to produce a second optical state. The second optical state is determined by a motion of a second plurality of particles having a second mobility, $\mu_2(V)$. At the first addressing voltage, $\mu_1(V_1)>\mu_2(V_1)$, and at the second addressing voltage $\mu_1(V_2)<\mu_2(V_2)$.

The method may include addressing the image pixel with a third addressing voltage, $V_3$, of opposite polarity to both $V_1$ and $V_2$ to produce a third optical state determined by a carrier medium and due to a motion of the first and second pluralities of particles away from the viewing surface of the display.

The method may include the step of addressing the image pixel with a third addressing voltage $V_3$ to produce a third optical state determined by a motion of a third plurality of particles having a third mobility, $\mu_3(V)$, where $\mu_1(V_1)>\mu_3(V_1)$, $\mu_2(V_2)>\mu_3(V_2)$, $\mu_3(V_3)>\mu_1(V_3)$ and $\mu_3(V_3)>\mu$ The first plurality of particles may have a charge that is a function of voltage. The particle carrier medium may have a viscosity that is a function of movement within the medium of the first plurality of particles. The particle carrier medium may have a viscosity that is a function of voltage.

The method may include addressing the image pixel with a third addressing voltage, $V_3$, to produce a third optical state. The third optical state may be determined by movement of the first and second pluralities of particles away from the viewing surface. The electrophoretic display may include a third plurality of particles having a third mobility, $\mu_3(V)$, where $|\mu_3(V)|<|\mu_1(V)|$ and $|\mu_3(V)|<|\mu_2(V)|$ for all voltages.

BRIEF DESCRIPTION OF THE DRAWINGS

The invention, in accordance with preferred and exemplary embodiments, together with further advantages thereof, is more particularly described in the following detailed description, taken in conjunction with the accompanying drawings.

In the drawings, like reference characters generally refer to the same parts throughout the different views. Also, the drawings are not necessarily to scale, emphasis instead generally being placed upon illustrating principles of the invention.

FIG. 16A is a graph of the mobility of two particle embodiments, where both types have a linearly increasing, positive mobility.

FIGS. 16B and 16C illustrate the behavior of particles corresponding to FIG. 16A, when voltages are applied to a display medium.

FIG. 19A is a graph that shows the mobility of embodiments of two types of particles.

FIGS. 19B and 19C illustrate the behavior of particles corresponding to FIG. 19A, when voltages are applied.

FIG. 20A is a graph that shows the mobility of embodiments of three types of particles.

FIGS. 20B, 20C and 20D illustrate the behavior of particles corresponding to FIG. 20A, when voltages are applied to a display medium.

DESCRIPTION

Figure 1:
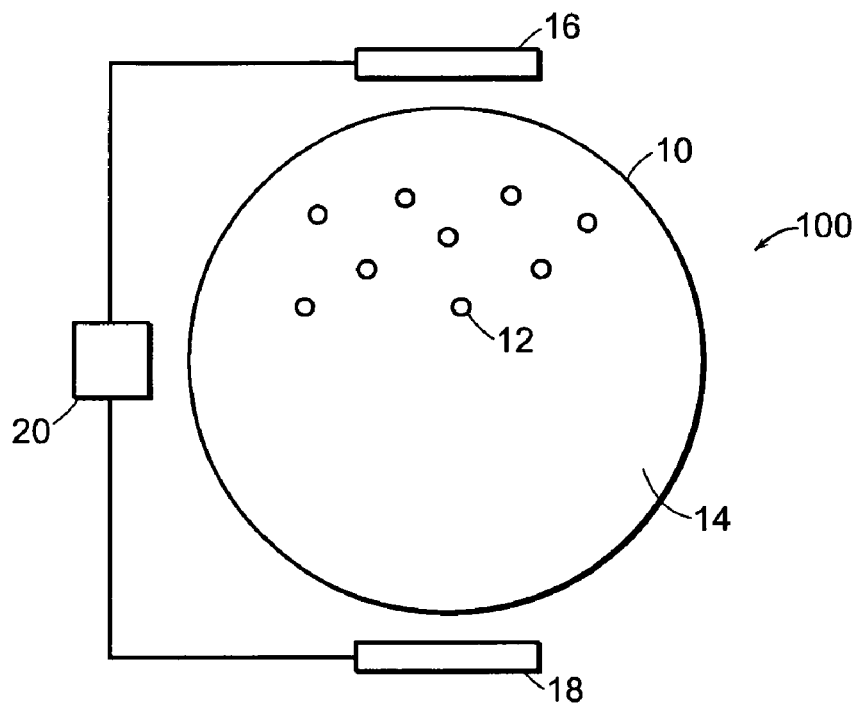
FIG. 1 shows a schematic depiction of a capsule containing particles that do not move under an applied voltage below a threshold value, according to the invention.

The present invention relates to methods and materials for an electrophoretic display that includes electrophoretic particles having a variable mobility. The mobility may vary as a function of an electric field applied by an addressing voltage. In some embodiments, the motion of charged pigment particles is substantially prevented under one set of conditions while being permitted at a relatively high velocity under a second set of conditions. In other embodiments, different sets of particles determine the optical characteristics of an image pixel at different voltages.

The invention may assist passive addressing of a display. The invention also can eliminate gravitational or diffusional motion of the pigment particles over time to enhance the bistable nature of certain displays. Throughout the Specification, the present invention will be described for encapsulated electrophoretic displays, but the methods and materials of the invention are applicable to unencapsulated electrophoretic displays.

In some displays, the particles have a slight tendency to stick on the walls of a display cell. If the potential of the electric field is too low, the particles will not leave the wall, and if the potential of the electric field is high enough, the particles will leave the wall and move in the cell. However, this technique apparently requires a long switching time, suggesting that the threshold voltage was too small to make the technique practical.

Thus, other approaches are needed to enable practical passive addressing. One approach is to use mechanisms that allow the particles to move only when the driving voltage exceeds some significant threshold value. This mechanism allows passive addressing and can be termed "voltage threshold addressing." Another approach employs an inverse electrorheological gate to control the display. This mechanism allows the rheological properties of the display medium to be altered along a "select" line such that an applied "data" line voltage can move the particles in this altered state but the same voltage is insufficient to move the particles in the unaltered state. Several examples for each approach are described below. Additionally, the creation of polymers and colloidal particles that can be used to achieve these approaches are described below.

Embodiments that relate to threshold voltage addressing are described below with reference to FIGS. 1–11. Embodiments that relate to electrophoretic ink composed of particles with field dependent mobilities, for use in color and/or grey-level displays, are described below with reference to FIGS. 12–25.

The remainder of this Description is divided into eight sections under the following headings: Electrophoretic Displays; Brief Introduction to the Theory of Electrophoretic Motion of Charged Particles; Voltage Threshold Addressing Techniques; Inverse Electrorheological Gating Techniques; Full Color Displays with Passive Matrix Addressing and Randomly Coated Capsules; Polymer and Colloidal Particle Design; Temperature Compensation of Threshold; and Electrophoretic Ink Composed of Particles with Field Dependent Mobilities.

I. Electrophoretic Displays

Electrophoretic displays have been the subject of intense research and development for a number of years. Electrophoretic displays have attributes of good brightness and contrast, wide viewing angles, state bistability, and low power consumption when compared with liquid crystal displays. Nevertheless, problems with the long-term image quality of these displays have prevented their widespread usage. For example, particles that make up such displays tend to cluster and settle, resulting in inadequate service-life for these displays.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. Thus, the resulting display can be flexible. Further, because the display media can be printed (using a variety of methods), the display itself can be made inexpensively.

In broad overview, the invention relates to encapsulated electrophoretic displays that provide a flexible, reflective display that can be manufactured easily and consume little power (or no power in the case of bistable displays in certain states), as well as materials and methods useful in their construction. Such displays, therefore, can be incorporated into a variety of applications. The display can be formed from and can include particles that move in response to an electric charge. This mode of operation is typical in the field of electrophoretic displays. A display in which the particles, ordered by an electric charge, take on a certain configuration can take on many forms. Once the electric field is removed, the particles can be generally stable (e.g., bistable). Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field, or a combination of the two. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

II. Brief Introduction to the Theory of Electrophoretic Motion of Charged Particles The electrophoretic motion of charged particles in a fluid is covered in most textbooks on colloid science. See, e.g. , Hiemenz, P. C. and Rajagopalan, R., *Principles of Colloid and Surface Chemistry*, $3^{rd}$ ed., Marcel Dekker, NY, 1997. In systems of interest for electrophoretic displays, the dielectric constant is usually low ($\epsilon_r \approx 2$), and the number of ions small.

In this regime the following equation is true $$\zeta = \frac{q}{2\pi\varepsilon_r\varepsilon_0 d_p} \quad (1)$$

where $\zeta$=zeta potential
q=net charge on the particle
$\varepsilon_r$=dielectric constant
$\varepsilon_0$=permittivity constant=8.85% $10^{-12}$ C$^2$/Nm$^2$, and
$d_p$=particle diameter In an applied electric field, $\vec{E}$, the particle will experience a force $$F_{el}=q\vec{E} \quad (2)$$

Solving Equation 1 for q and substituting in Equation 2, yields the following equation $$F_{el}=2\pi\varepsilon_r\varepsilon_0 d_p\zeta\vec{E} \quad (3)$$

The shear stress exerted by a particle on the surrounding medium may be approximated as the force exerted on the particle (by, for example, gravity or in this case the electric field) divided by the surface area, A, of the particle. Although this is not strictly correct, it gives a numerical value well within the range of values calculated by more rigorous derivations. Thus, the shear stress exerted on the medium by a charged particle in an electric field can be taken as $$\tau_{el} = \frac{F_{el}}{A} = \frac{2\pi\varepsilon_r\varepsilon_0 d_p\zeta\vec{E}}{\pi d_p^2} = \frac{2\varepsilon_r\varepsilon_0\zeta\vec{E}}{d_p} \quad (4)$$

The electrophoretic velocity of a charged particle in a medium is found by balancing the electrostatic force on the particle, $F_{el}$, with that due to viscous drag, which is given by $$F_{vis}=3\pi\eta d_p v \quad (5)$$

where $\eta$ is the apparent viscosity of the medium and v is the particle velocity. Thus, the electrophoretic velocity is given by $$v = \frac{q\vec{E}}{3\pi\eta d_p} \quad (6)$$

Or, combining this with Equation 1, $$v = \frac{2\varepsilon_r\varepsilon_0\zeta\vec{E}}{3\eta} \quad (7)$$

In the usual case the viscosity, $\eta$, and the $\zeta$ potential are constant. Cases are presented in which either a constant $\zeta$ or a field dependent $\zeta$ are combined with a viscosity, $\eta$, that is (a) constant, (b) a function of the shear stress (using the Herschel Bulkley model), or (c) a function of both the shear stress and the applied electric field.

The Herschel Bulkley equation models a material that has a yield stress and flows like a power law fluid above this stress. The equation is:

$$\tau=\tau_H+(\eta_H D)^p \quad (8)$$

where $\tau$=shear stress
$\tau_H$=yield stress
$\eta_H$=Herschel Bulkley viscosity
D=shear rate, and
p=Herschel Bulkley index The apparent viscosity needed to calculate the electrophoretic velocity is then obtained by rearranging Equation 8 to obtain $$\eta = \frac{\tau_{el}}{D} = \frac{\tau_{el}\eta_H}{(\tau_{el} - \tau_H)^{\frac{1}{p}}} \quad (9)$$

Equation 9 is valid for $\tau_{el}>\tau_H$. For $\tau_{el}\leq\tau_H$, the model considers the apparent viscosity to be infinite. That is, the material behaves like a solid below the yield stress. For a fluid that is a function of both the shear stress and the applied electric field, this model is modified to incorporate a field dependent yield stress:

$$\eta = \frac{\tau_{el}}{D} = \frac{\tau_{el}\eta_H}{\left(\tau_{el} - \frac{\tau_H}{k\vec{E}}\right)^{\frac{1}{p}}} \quad (10)$$

where k is a constant, and the equation is valid for values of $\tau_{el}>\tau_H/k\vec{E}$. Below this value, the material behaves as a solid, and the apparent viscosity is infinite.

In the present analysis, the nominal $\zeta$ potential is defined as $\zeta_0$, and is set to be 100 mV. For cases in which the $\zeta$ potential is constant, the relation $\zeta=\zeta_0$ is used. For the cases in which the $\zeta$ potential is field dependent, the following relation is used:

$$\zeta=2\zeta_0 e^{0.32} \quad (11)$$

The Herschel Bulkley model is an approximation of the actual physics that occurs in a real system, as is every theoretical model. However, it is sufficiently accurate to demonstrate the effects of rheology on the system. The values listed below are appropriate for the exemplary embodiments that are presented hereafter:

Herschel Bulkley viscosity, $\eta_H$=0.003 Pascal seconds
Herschel Bulkley yield stress, $\tau_H$=4 Pascals
Herschel Bulkley index, p=0.8
Field dependent HB constant, k=3

For the cases in which the viscosity is constant, the relation $\eta=2\eta_H/3$ is used. Equations 9 and 10, with the above constants, are used for the non-Newtonian viscosity case and the field dependent viscosity cases. It will be appreciated that in other embodiments, somewhat different parameters may be used without departing from the spirit and scope of the present invention.

III. Voltage Threshold Addressing Techniques

Under a voltage threshold addressing approach, the velocity of the particles goes from substantially zero, below a lower voltage level, (e.g. a threshold level), to a relatively high velocity, at a voltage equal to or greater than the threshold level. In certain embodiments, this increase in velocity occurs as the voltage increases by a factor of two or three (i.e., as the voltage goes from V/2 to V or from V/3 to V, which is referred to as "V/2" or "V/3" addressing, respectively), and the change may occur in a non-linear manner. The velocity of the particles at the higher voltage is substantially larger when compared with the velocity of the particles at the lower voltage. A threshold voltage lies between the lower voltage and the higher voltage such that a voltage at or above the threshold voltage will cause the particles to move at this higher velocity.

Figure 2:
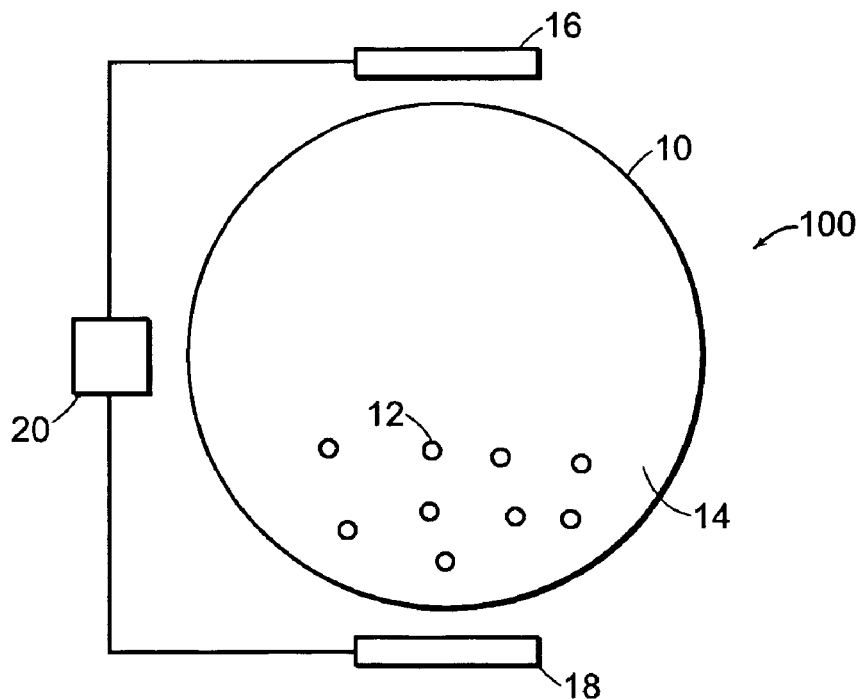
FIG. 2 shows a schematic depiction of a capsule containing particles that move under an applied voltage at or above a threshold value, according to the invention.

Now referring to FIGS. 1 and 2, a capsule 100 has a capsule wall 10 that defines the capsule 100. A carrier medium 14 (also referred to as a suspending medium, suspending fluid, or carrier fluid) is contained within the capsule 100. Particles 12 (for example, pigment particles) are suspended in the carrier medium 14. A source of voltage 20 provides voltage to the capsule 100 via two electrodes 16, 18. In FIG. 1, a voltage below the threshold voltage is applied to the capsule 100. The particles 12 remain substantially stationary in the carrier medium 14. However, in FIG. 2, a voltage at or above the threshold voltage is applied to the capsule 100. The particles 12 move at a velocity that is rapid compared to the velocity of the particles 12 shown in FIG. 1.

Figure 4:
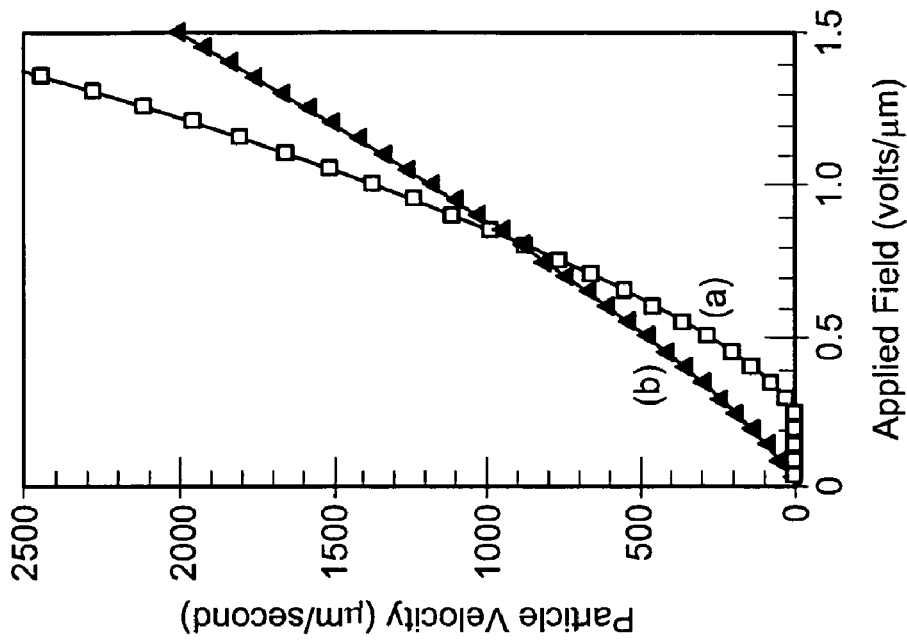
FIG. 4 is a graph in which curve (a) shows the velocity of electrophoretic particles having a field dependent zeta potential in a fluid obeying the Herschel Bulkley model for viscosity as a function of applied field, according to the invention, and curve (b) shows the velocity of electrophoretic particles having a field dependent zeta potential in a fluid having a constant viscosity as a function of applied field, according to the invention.
Figure 3:
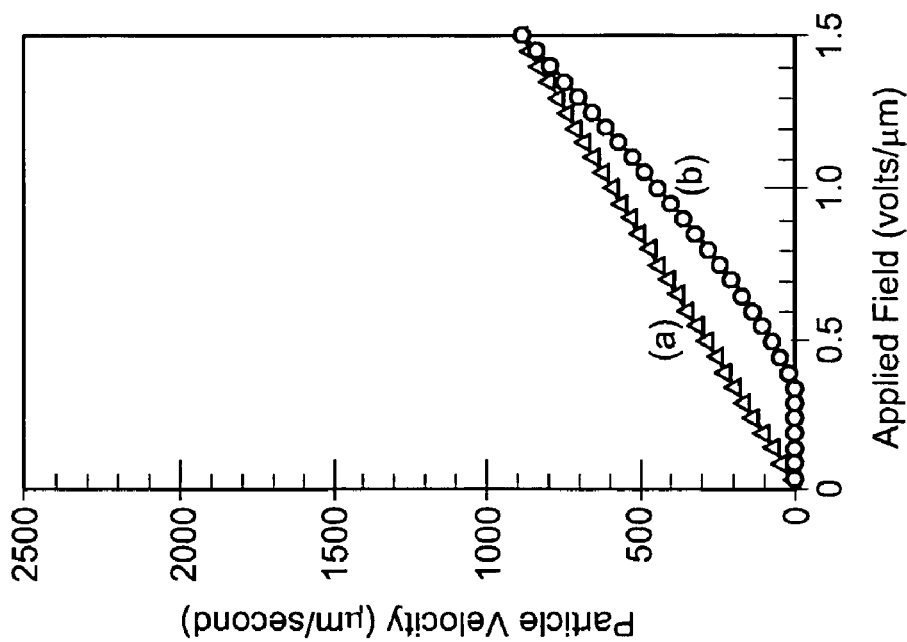
FIG. 3 is a graph in which curve (a) shows the velocity of electrophoretic particles having a constant zeta potential in a fluid having a constant viscosity as a function of applied field, according to the invention, and curve (b) shows the velocity of electrophoretic particles having a constant zeta potential in a fluid obeying the Herschel Bulkley model for viscosity as a function of applied field, according to the invention.

Examples of such velocity-voltage relationships are shown in FIGS. 3–6. FIG. 3 shows the usual situation in which the particle charge and the fluid viscosity are constant and there is no threshold due to particle sticking (curve (a)). In this case, the particle velocity increases linearly from zero with applied electric field. In FIG. 3 the particle charge is still constant, but the fluid that the particles move in has a yield stress (curve (b)). Below a certain electric field the particles cannot move in this fluid. Above the threshold the particles can move and the apparent viscosity continues to decrease, allowing the particle velocity to increase faster than linearly. FIG. 4 shows a system with this same fluid, but the particle charge is now a function of the applied field (curve (a)). Once again, a threshold voltage must be exceeded for the particles to move, but the velocity increases even faster than in FIG. 3 curve (b). FIG. 4 curve (b) shows the effect of having a field dependent particle charge, but a constant viscosity fluid. The velocity increases faster than in FIG. 3 curve (a), but there is no threshold voltage.

Figure 6:
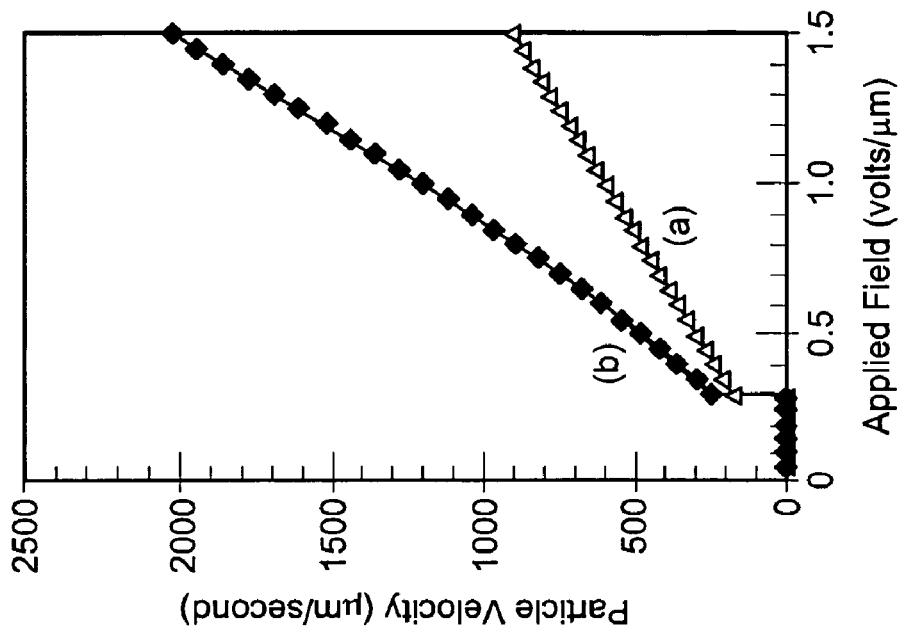
FIG. 6 is a graph in which curve (a) shows the velocity of electrophoretic particles having a constant zeta potential in a fluid having a constant viscosity, with the addition of a particle sticking threshold, as a function of applied field, according to the invention, and curve (b) shows the velocity of electrophoretic particles having a field dependent zeta potential in a fluid having a constant viscosity, with the addition of a particle sticking threshold, as a function of applied field, according to the invention.
Figure 5:
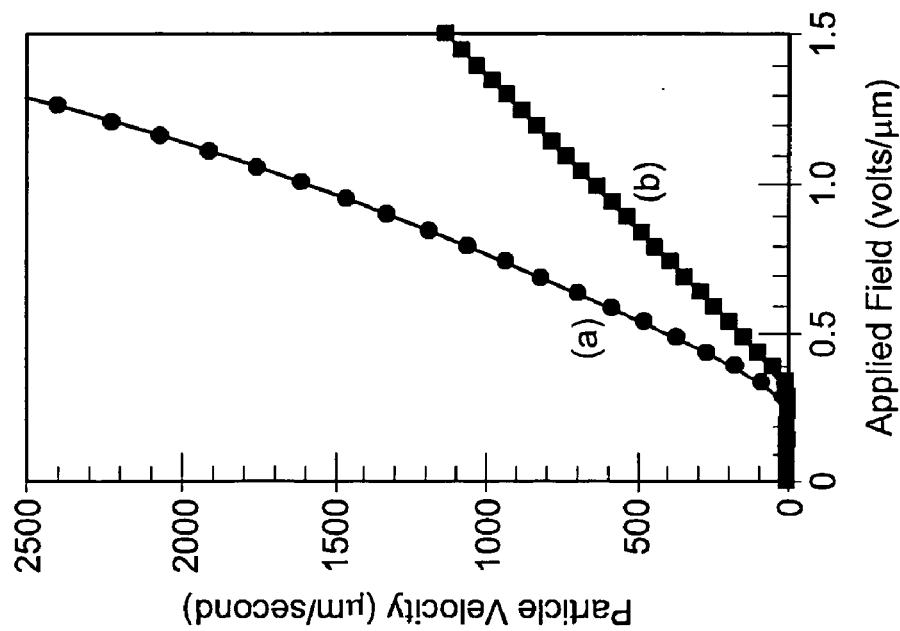
FIG. 5 is a graph in which curve (a) shows the velocity of electrophoretic particles having a field dependent zeta potential in a fluid having a field dependent Herschel Bulkley model for viscosity as a function of applied field, according to the invention, and curve (b) shows the velocity of electrophoretic particles having a constant zeta potential in a fluid having a field dependent Herschel Bulkley model for viscosity as a function of applied field, according to the invention.

FIG. 5 shows the result of having a fluid whose properties change as a function of applied field. Both curves (a) and (b) have a threshold due to the yield stress of the fluid, but the one in which the particle charge is also a function of the applied field shows the most rapid increase in velocity as the voltage is increased. An additional small threshold due to particle sticking at the wall would have little effect on FIG. 3 curve (b), FIG. 4 curve (a), FIG. 5 curve (a), or FIG. 5 curve (b) because they already have a significant threshold from the rheology of the liquid. The two constant viscosity examples (FIG. 3 curve (a) and FIG. 4 curve (b)) have no threshold. The addition of a particle sticking threshold would keep the velocity at zero until the threshold was reached, followed by a jump up to the existing curve at that applied field. This behavior is shown in FIG. 6. These figures are illustrative of the concept of a nonlinear velocity-voltage response and are in no way limiting. Other velocity-voltage functions also are useful.

A number of techniques and mechanisms can be used alone or in combination to accomplish a large increase in velocity upon application of an electric field at or above a threshold voltage. In one embodiment, such a large increase can be represented by a function of time such as a step-change, or more generally, an increase of velocity that is substantially abrupt over a small range of applied field, and which remains at an elevated level at still higher applied fields. Examples of changes of this type are presented below. Some of the techniques and mechanisms to achieve such abrupt changes in velocity with applied field can be grouped into three categories: (A) adherence of particles to each other and/or to the walls of the capsules or device; (B) use of a structured medium through which the particles move; and (C) non-linear field effects on the motion of the particles. These techniques are described below.

III.A. Adhesion

As described above, some particles exhibit a slight tendency to adhere to the wall of a capsule. If the potential is below some threshold value, the particles will not leave the wall. Typically, this threshold is quite low and results in a long switching time between states. However, the surface chemistry of the components of the system can be manipulated to enhance the tendency for the particles to stick to the inside of the capsule wall (or display cell wall) to provide a significant threshold value.

Because not all the particles are in contact with the wall, if only the wall surface is modified, a large effect typically will not be achieved. Under a first voltage, the particles move to a side of the capsule and multiple layers of particles are positioned at varying distances away from the wall. When the voltage is reversed, the particles that are not in contact with the wall move to the opposite wall without the need to apply a potential at or above the threshold value. Thus, in certain embodiments, the particles are caused not only to adhere to the wall, but also to adhere to each other when they are in the vicinity of the wall.

When the level of a dispersant is low, the particles, such as titanium dioxide ("$TiO_2$") particles, aggregate with each other and become attached to the walls of the capsule. A dispersant is a surface active agent (surfactant) capable of aiding the creation of or stabilization of a dispersion of one material in another material in which it is substantially insoluble. That is, the dispersant helps to create or maintain small droplets or particles of the dispersed phase in a second, continuous phase by decreasing the work necessary to break the particles and/or by decreasing the tendency for the small particles to re-aggregate. In the current context, the dispersed material is a solid that is dispersed as small particles in a liquid in which it is substantially insoluble. Thus, by controlling the type and amount of dispersants used, the magnitude of the particle-particle and particle-wall interactions can be selected. Thus, in effect, the threshold voltage can be selected. For example, in the case of dispersants such as OLOA 1200 (Chevron Oronite Company LLC, New Orleans, La.), the functional groups that are believed to physically anchor the dispersant material to the pigment particle surface are polyamines, such as diethylene triamine, which are attached to a polyisobutylene chain by a succinimide or succinamide group. By varying the molecular weight of the oil soluble polyisobutylene chain, the thickness of the steric layer on the particles can be adjusted, thus controlling the particle-particle and particle-wall attraction. Dispersants for nonaqueous suspensions or dispersions work by providing steric barriers and often combined steric and electrostatic barriers that prevent the particles from aggregating. For pigment particles for electrophoretic displays, the dispersant usually must be polymeric to provide a sufficient barrier. By reducing the magnitude of the steric barrier a controlled aggregation can be achieved.

In general, block or graft copolymers can be used as dispersants when one of the block materials is soluble in the carrier medium and the other component has limited solubility in the carrier medium, or has a specific affinity for the particle surface. The block with the affinity for the particle surface serves as an anchoring group, while the soluble block provides the steric barrier around the particle. In the case of the OLOA 1200 mentioned above, the polyisobutylene is the soluble component while the polyamine can interact strongly with, for example, a titanium dioxide, silica, or alumina surface. Soluble blocks suitable for use in electrophoretic systems include polyisobutylene, poly(ethylene-co-butylene), polybutadiene, polyethylhexylacrylate, polyethylhexylmethacrylate, poly(ethylhexylacrylate-co-styrene), polyhydroxystearic acid, polystyrene, polydimethylsiloxane, etc. The suitability depends on the nature of the carrier medium. The anchoring component can be a polymer containing cationic functionality, such as a polyamine or polyvinylpyridine. It can be a polymer containing anionic functionality, such as polyacrylic acid or other polymers containing carboxylate, sulfonate, phosphate, or phosphonate groups. It can be a polymer containing nonionic polar functionality, such as polyethylene oxide or a polyamide. The anchoring can also be enabled by functional end groups on the soluble polymer block, or by functional groups along the soluble backbone as long as the number of monomer units between groups allows loops of soluble polymer to extend out into the carrier medium. Commercial dispersants of use in electrophoretic displays include, but are certainly not limited to, the following examples: OLOA 371 (Chevron Oronite Company LLC, New Orleans, La.), SOLSPERSE 17000 (Avecia, Inc., Wilmington, Del.), SOLSPERSE 13940 (Avecia, Inc.), SOLSPERSE 3000 (Avecia, Inc.), ZEPHRYM PD5464 (Uniqema, New Castle, Del.), ZEPHRYM PD2246SF (Uniqema), ZEPHRYM PD2234 (Uniqema), ZEPHRYM PD1000 (Uniqema), GANEX V216 (ISP Technologies Inc., Sea Drift, Tex.), and DC5225C (Dow Corning, Midland, Mich.).

Chemisorbing oil soluble chains of controlled molecular weight to the surface of the particles can create similar behavior. The soluble polymer chains referred to here are the same as those discussed above for dispersants. The difference is in the covalent bonding of the chains to the particle surface. While dispersants are only physisorbed to the surface and are in a dynamic equilibrium with dispersant molecules in solution, the chemisorbed polymer cannot leave the particle surface. The latter approach has the advantage of not requiring the presence of an equilibrium concentration of the dispersant in the bulk suspending fluid, thus allowing a lower conductivity to be maintained. Examples of the behavior of systems with a threshold based on adhesion are shown in FIG. 6.

III.B. Structured Medium

Another way to hinder the motion of the charged pigment particles below a threshold voltage is by making the fluid through which they move "non-Newtonian." A Newtonian fluid is one for which there is a linear relationship between the shear stress and the shear rate, and the shear stress is zero at zero applied shear rate. That is, the apparent viscosity (i.e., the shear stress/shear rate) is a constant over all shear rates and shear stresses. All other fluids are non-Newtonian. Non-Newtonian fluids are those that do not exhibit such a linear relationship, but rather exhibit a non-linear relationship in shear stress to changes in shear rate applied. Equivalently, the apparent viscosity is not constant over all shear rates and shear stresses. Some non-Newtonian fluids can behave like Newtonian fluids over some range of flow conditions. By creating a structured or complex fluid, a carrier medium containing particles has an apparent viscosity that is a function of the shear force exerted on it by the pigment particles when they are acted on by the applied electric field. Alternatively, the viscosity of the structured fluid itself can be directly influenced by the applied electric field.

III.B.1. Gelled Medium

The shear stress that a charged particle exerts on the fluid surrounding it is a function of the applied electric field, the particle charge, and the particle size. For a given particle, the shear stress that it exerts in a traditional electrophoretic display is generally proportional to the applied field. In a Newtonian fluid, this effect translates into a linear increase in the electrophoretic particle velocity with increasing applied electric field (i.e., with increasing voltage). See FIG. 3 curve (a). In contrast, a fluid with a yield stress and a rapidly decreasing apparent viscosity above the yield stress can facilitate a system for which the particle velocity is zero below the threshold voltage and is significant at or above the threshold voltage. See FIG. 3 curve (b). The velocity of the particle increases at a rate that is proportional to the applied voltage and inverse to the viscosity, as described by Equation 7 above. Therefore, decreasing the viscosity as a function of increased voltage, all other parameters being held substantially constant, results in a non-linear velocity profile with applied voltage.

III.B.1.a. Functionalized Polymers

Hydrocarbon fluids are typically used in electrophoretic displays as a carrier medium to suspend the particles. One way to convert such fluids into a structured fluid with the characteristic described above is to add a polymer. The polymer can be composed of a soluble backbone with a small number of functional groups along the backbone that can physically associate with the functional groups on other polymer chains. One alternative polymer architecture is an "ABA" block copolymer with an oil soluble B block, such as polyisobutylene or poly(ethylene co-butylene), and A blocks that associate in the oil. The A blocks form groups (or micelles) comprised of more than two A groups, such that a cross-linked system is developed.

Polymer concentration as used in this disclosure means the concentration of the polymer in solution, usually expressed as grams of polymer per liter of solution, or other similar units. At low concentrations the polymer molecules are individual molecules in a sea of solvent. The polymer chain interacts with the solvent and other parts of the same chain. The concentration at which the polymer coils of one molecule begin to overlap with neighboring molecules is referred to as the overlap concentration, often symbolized by $c^*$. Above this concentration the properties of the polymer solution change as the polymer molecules interact with each other as well as the solvent. The overlap concentration is a function of the molecular weight of the polymer, the "stiffness" of the polymer, and the polymer-solvent interaction.

As long as the polymer concentration is above the overlap concentration, such polymeric systems will form a continuous, physically cross-linked network in solution. The value of the yield stress is a function of the polymer concentration, the number of functional groups per chain, and the strength of the interaction between the functional groups. The yield stress increases with an increase in any of these three variables.

Thus, in this system, at or above a threshold voltage, the particles move more easily through the carrier medium than they do below the threshold voltage. The particles disrupt the structure of the carrier medium as they pass through the medium. Such a structure is expected to reform rapidly after being disrupted (or "broken") by the passage of the pigment particles through it. A rapidly reforming structure reduces the waiting time necessary before the next line can be addressed. Until the structure reforms, the particles are able to move below the threshold voltage. Thus, the faster the structure reforms, the faster the entire display can be changed, but the single switching time between states does not change. Also, the polymer molecules should be non-ionic, or carry a net zero charge, so that they do not translate in an applied electric field.

III.B.1.b. Particulate Networks

Another way to create a network structure that will prevent or impede the motion of the pigment particles is to form a floc structure composed of structure-forming particles that have a net zero charge, which are different particles from the pigment particles. The structure-forming particles flocculate to form the gel but do not translate in an applied electric field. As with the polymer systems discussed above, the network of structure-forming particles should reform quickly after being broken down by the shearing action of the pigment particles passing through it. It is also useful to create the floc network with as small a volume fraction of structure-forming particles as possible. The minimum apparent viscosity that can be achieved when the floc structure is completely disrupted is a function of the volume fraction of structure-forming particles. The minimum apparent viscosity becomes a rapidly increasing function above about 10% volume fraction. From 0 to about 10 volume percent of particles the viscosity of a stable dispersion will follow the Einstein relationship: $\eta/\eta_o=1+2.5\phi$, where $\eta$ is the apparent viscosity of the dispersion, $\eta_o$ is the viscosity of the solvent, and $\phi$ is the volume fraction of particles in the dispersion. Above about 10% the viscosity increases more and more rapidly. The flocculation can be created by a number of mechanisms, as follows.

III.B.1.b.i. Dispersion Force Attractions

One flocculation mechanism is to reduce the stabilizing influence of a dispersant in the carrier medium in a controlled fashion in order to attain a particle-particle attraction that is sufficient to produce the desired yield stress. A sufficient particle-particle attraction is usually greater than about 5 kT, where k is the Boltzmann constant and T is the absolute temperature. The laws of thermodynamics teach that average kinetic energy of the molecules in a sample is given by 1.5 kT. Hence, a value of about 5 kT is sufficient to result in a yield stress that will not be disrupted by simple thermal agitation, at conventional ambient temperatures.

III.B.1.b.ii. Depletion Flocculation

The floc network also can be created by the presence of a non-adsorbing polymer. The ratio of the particle size to the polymer size and the concentrations of each must be balanced for this embodiment to function properly. However, it will produce a floc structure that will continue to reform after each shear event. Depletion flocculation is caused by the exclusion of the non-adsorbing polymer molecules from the space between two particles when that space is equal to or smaller than the size of the polymer molecule in solution. The osmotic pressure difference between the area depleted of polymer and the rest of the solution results in a net force of attraction between the two particles.

III.B.1.b.iii. Anionic/Cationic Functionalized Particles

A controlled floc network also can be established through the use of ionically functionalized particle surfaces. The floc particle surfaces are chemically modified, for example, by chemisorbing the appropriate mix of molecules onto the surface, to create a surface that is predominately lyophilic, but that has a very low density of both cationic and anionic functional groups. The number of charge sites should be chosen such that the floc particle approximately has a net zero charge in order to prevent it from migrating in the applied electric field. By placing the charge groups far enough apart, the floc particle will act like a partially neutralized colloidal particle for which the charge patches of opposite charge can attract each other on a local scale. The opposite charge patches enable the structure-forming particles to form the network structure. This network structure provides the yield stress, which impedes the motion of the pigment particles below the threshold. Thus, this floc network is expected to be strong enough to resist the motion of pigment particles under an electric field, until the threshold electric field is exceeded, at which point the floc network gives way to the motion of the pigment particles.

III.B.2. Inverse Electrorheological Fluids

In another embodiment, inverse electrorheological ("ER") fluids can be used to provide threshold addressing. Conventional ER fluids typically are fluids that develop a yield stress when a strong electric field is applied across them. In contrast, an inverse ER fluid has a high apparent viscosity or a yield stress in the absence of a field. At a sufficiently high applied electric field, the inverse ER fluid rapidly becomes less viscous. Inverse ER fluids, examples of which are presented later, are compatible with the voltage threshold addressing approach.

For example, either a particle floc structure or a functionalized, oil soluble polymer can be used as a component of the inverse ER fluid and the formed network can be disrupted at a voltage above a threshold voltage. In certain inverse ER fluids composed of anionic/cationic functionalized particles in a floc structure the structure-forming particles described above play a more active role than in non-ER situations. When a sufficiently high voltage is applied, the paired charge sites on adjacent structure-forming particles can move apart and temporarily disrupt the floc network, allowing the charged pigment particles to move through the capsule or across the display. In other embodiments of inverse ER fluids composed of polymers, a polymer can have a lyophilic polymer backbone either with functional end blocks or with a low density of functionalized groups along the polymeric chain. Lyophilic polymers suitable for use in electrophoretic systems include polyisobutylene, poly(ethylene-co-butylene), polybutadiene, polyethylhexylacrylate, polyethylhexylmethacrylate, poly (ethylhexylacrylate-co-styrene), polyhydroxystearic acid, polystyrene, polydimethylsiloxane, etc. The suitability depends on the nature of the carrier medium. The functional groups can be cationic, such as an amine or vinylpyridine. They can be anionic, such as a carboxylate, sulfonate, phosphate, or phosphonate group. If the functional groups are anionic and cationic groups, there should be an approximately equal number of them so that the polymer has approximately a net neutral charge and does not substantially migrate in the applied electric field. The ion pairs should be strong enough so that they do not dissociate when a voltage below the threshold voltage is applied but do dissociate and move away from each other when a voltage above the threshold voltage is applied. The individual functionalized segments of the polymer can move in the field, but the entire polymer molecule stays essentially where it started. While the ion pairs are dissociated, the charged pigment particles can more easily move through the inverse ER medium.

III.C. Non-Linear Field Effects

III.C.1. Field Dependent Particle Mobility

Typically, the force applied to a charged particle in an electric field in a low dielectric medium is just the particle charge times the applied electric field. Thus, there is a linear relationship between the applied electric field and the shear stress exerted by the particle, which leads to a linear increase in particle velocity in a Newtonian fluid. That is, if the field is doubled, the force on the particle is doubled, causing the shear stress exerted by the particle on the suspending medium to double, and, in a Newtonian fluid, the velocity of the particle will be doubled. FIG. 3 curve (a) shows the relationship between particle velocity and applied electric field for this circumstance. The surface of pigment particles can be functionalized with suitable ion pairs. For example, an anionic site is placed on the particle and is balanced with a cationic counter ion (or vice versa).

For electrophoresis, one needs to get the counter ion (the cation in this case) away from the charge site on the particle and outside of the shear plane. The solvent inside the shear plane travels with the particle. The effective charge on the particle is the net charge inside this shear plane. Thus, if all the counterions remain at the surface, within this shear plane, the particle will be effectively uncharged. One can cause additional counterions to move away from the particle surface by increasing the electric field under the right conditions. The field needs to be high, as is contemplated in the present invention, and the ion pairs need to be weak enough that the increased field is sufficient to overcome the attraction between the ions.

By controlling the strength of these ion pairs, the charge of a particle can be controlled as a function of an applied electric field. For example, the strength of the ion pairs can be controlled by manipulating the amount of steric hindrance around the charge group, by varying the degree of charge delocalization, or by varying the dielectric constant of the solvent. In this way particles can be created for which the charge increases with increasing electric field, and the shear stress exerted by the particle on the suspending medium will increase faster than the usual linear relationship. FIG. 4 curve (b) shows the effect of such a field dependent particle charge on the electrophoretic velocity of the particle in a Newtonian medium. This effect, in combination with a structured medium for which the apparent viscosity is decreasing with increasing shear stress, leads to a significantly steeper increase in electrophoretic velocity with increasing electric field than is seen for the constant charge particle in a Newtonian medium. Examples of this effect are shown in FIG. 4 curves (a) and (b) and FIG. 5 curve (a).

III.C.2. Medium (IER Fluids)

Inverse electrorheological fluids also can exhibit non-linear effects. As explained above, inter-molecular or inter-particle attachments, which act as physical cross-links, provide the polymer or particulate networks with their non-Newtonian flow properties. As described above, in inverse ER fluids, these intermolecular or inter-particle attachments are disrupted by electric fields of sufficient magnitude. When the number of attachments that are disrupted increases as the field increases, the apparent yield stress and apparent viscosity curve will decrease as the field is increased. This effect, in combination with the non-linear behavior of the pigment particles discussed above, will lead to a much sharper jump in particle velocity as a threshold voltage is exceeded. FIG. 5 curve (a) combines a field dependent viscosity fluid with particles that have a field dependent charge. FIG. 5 curve (b) shows the effect of applied electric field on the particle velocity for a system with a field dependent viscosity with constant charge. Both have the desired zero velocity below the threshold, but the combination of effects in FIG. 5 curve (a) show a sharper increase in velocity above the threshold as compared to FIG. 5 curve (b).

IV. Inverse Electrorheological Gating Techniques

As an alternative, instead of using the passive matrix "select" and "data" lines to carry out a V/2 or V/3 addressing scheme, the "select" lines can be used to apply AC voltages of various amplitudes and frequencies to a display of capsules. If a polymeric or particulate network structure in the suspending medium of the capsules can be disrupted by this AC field, a DC field applied on the "data" lines can be used to move the pigment particles through the suspending medium of capsules in a display only on the selected line of the display. The suspending fluid of the capsules addressed by the unselected lines (i.e., the absence of or an insufficient about of an AC voltage in capsules of the display) presents an insurmountable yield stress for the pigment particles under the same DC field, and the pigment particles do not move in the capsules addressed by these unselected lines.

Figure 7:
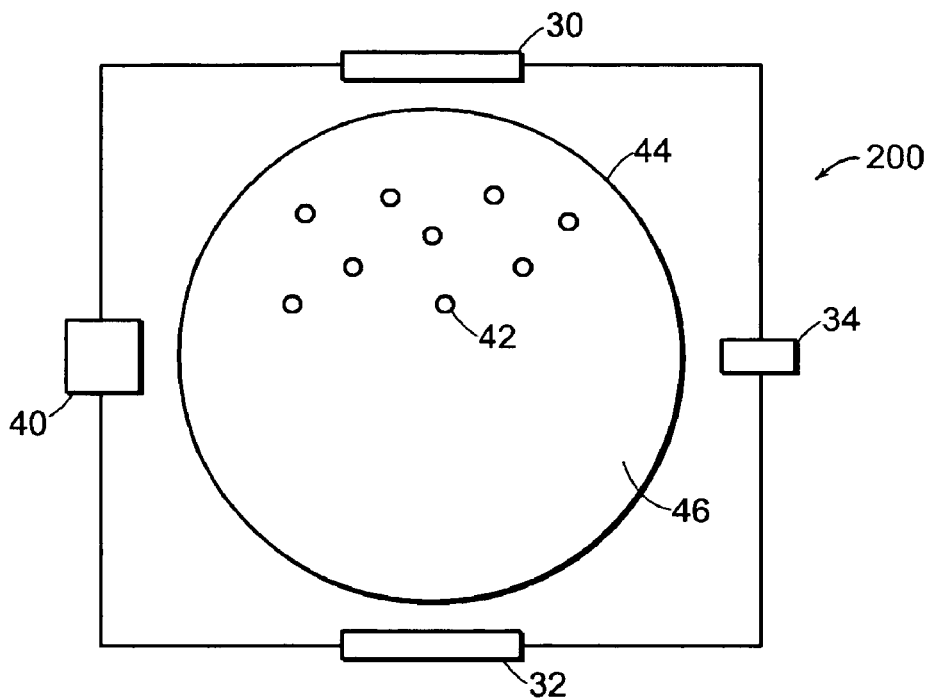
FIG. 7 shows a schematic depiction of a capsule containing particles that do not move under an applied AC voltage below a threshold value and an applied DC addressing signal, according to the invention.
Figure 8:
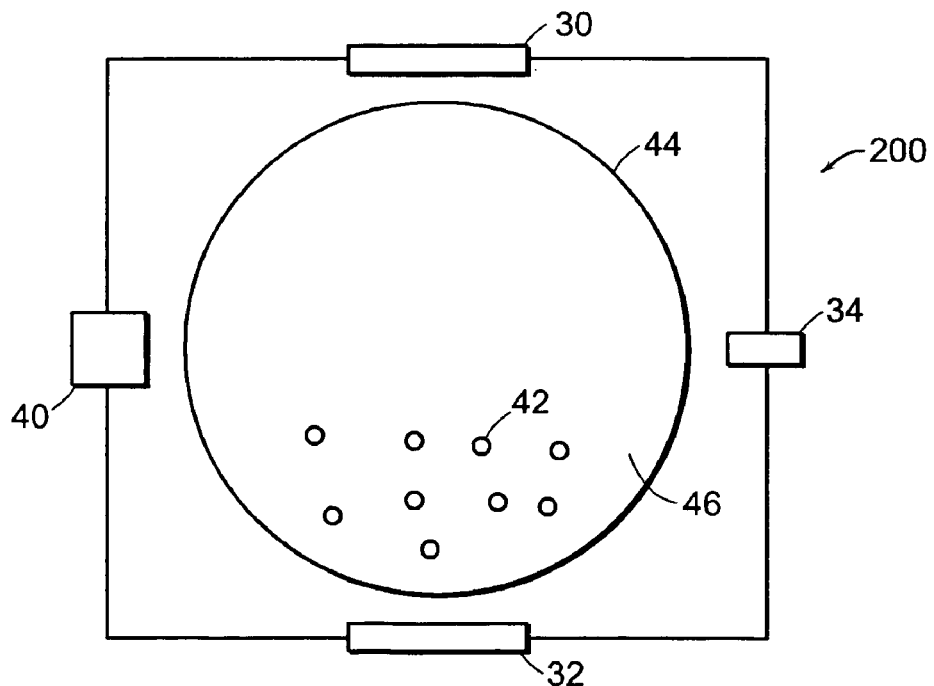
FIG. 8 shows a schematic depiction of a capsule containing particles that move under an AC applied voltage at or above a threshold value and an applied DC addressing signal, according to the invention.

For example, and referring to FIGS. 7 and 8, a capsule 200 is defined by a capsule wall 44 and contains a suspending medium 46 and pigment particles 42. The suspending medium 46 is an ER fluid. A DC voltage, generated by a voltage generator 34 and applied through electrodes 30, 32 cannot move the pigment particles 42 (FIG. 7). However, when an AC voltage, generated by a second voltage generator 40, is applied to the capsule 200 through the electrodes 30, 32, and the DC voltage is applied, the particles 42 move across the capsule 200 (FIG. 8). The AC voltage disrupts the network structure of the suspending medium 46. Examples of several polymeric and particulate network systems are described below.

IV.A. Polymeric Networks

IV.A.1. Controlled Ion Pairs

One suspending fluid that is suitable for inverse electrorheological gating is a substantially soluble polymer backbone with an approximately equal number of anionic and cationic functional groups either in the backbone or on grafts along the backbone . The density of functional groups should be low (<2 mole %). This polymer is described in more detail above. Generally, the functional groups can form intermolecular ion pairs when the polymer is present above the overlap concentration , $c^*$, as defined earlier. This network of polymers in the suspending medium can form a gel. A substance is a gel if it (1) has a continuous structure with macroscopic dimensions that is permanent on the time scale of an analytical experiment and (2) is solidlike in its rheological behavior. (See, for example, Flory, P. J. *Discussions of the Faraday Society* 1974, 57, 7) The strength of attraction between these ion pairs can be manipulated, for example, by controlling the amount of steric hindrance around a charge group (for example, attaching a tri isoamyl ammonium group to the polymer or using tetra isoamyl ammonium as the counterion), by varying the degree of charge delocalization (for example, using the picrate ion, which has a highly delocalized charge that produces a weaker ion pair), or by altering the dielectric constant of the solvent (for example, raising the dielectric constant from 2 to 4 will weaken the ion pair interaction by a factor of 2). Controlling the strength of these ion pairs allows for control of the strength of the physical cross-links in the gel system. Thus, by appropriately setting the strength and number of cross-links, the yield stress of the gel is set to be large enough to prevent the pigment particles from moving under the data line DC field. When the AC field is applied to a select line, it disrupts the ion pairs, the gel liquefies, and the pigment particles move across the capsules addressed by the select line in the display device. When the AC field is removed, rapid diffusion of the polymer segments allows ion pairs to re-combine quickly, and the gel is restored in a rapid manner. The gel should be restored in a time substantially less than the duration that a display will hold a particular image, for example, in less than one-tenth the duration of the image.

IV.A.2. Zwitterionic Groups

Zwitterionic groups also can be added to the soluble polymer backbone to produce a suspending medium that is an IER fluid with properties that allow inverse electrorheological gating. Zwitterionic groups contain both an anionic and a cationic charge in close proximity to each other, usually with one to three methylene groups separating the charges. These groups can interact with one another in organic solvents. This interaction provides physical cross-links in the suspending medium to form a gel. An AC voltage of sufficient amplitude and correct frequency will disrupt these interactions, allowing the gel to liquefy. For example, applied fields with amplitudes in the range of 100 to 10,000 volts/cm and frequencies in the range of 10 Hz to 10 MHz can be expected to provide acceptable performance. Again, the rapid diffusion of the polymer segments leads to a rapid restoration of the solidity of the gel when the AC field is removed. The gel can be expected to regain 50% of its structure in less than one second.

IV.B. Particulate Floc Networks

IV.B.1. Controlled Ion Pairs

A network in a suspending medium, such as a controlled floc network, also can be established through the use of ionically functionalized particle surfaces. The structure-forming particle surfaces are chemically modified (for example, by chemisorbing an appropriate mix of molecules onto the surface) to create a surface that is predominately lyophilic, but that has a relatively low density of both cationic and anionic functional groups. This can be accomplished, for example, by treating the particle surface with functional silanes, such as aminopropyltriethoxy silane, (trihydroxysilyl)-propylmethylphosphonate, or the like. The number of charge sites should be chosen so that the structure-forming particle has approximately a net zero charge and that it will not substantially move under an applied electric field. By placing the charge groups far enough apart, the structure-forming particle will act like a partially neutralized colloidal particle for which the charge patches of opposite charge can attract each other on a local scale. The application of AC voltage to the select line tends to disrupt the interaction of the structure-forming particles in the floc network of the suspending fluid in capsules addressed by the select line. This disruption can cause the suspending medium to liquefy, allowing the substantially immobilized pigment particles to move under an applied DC field in capsules addressed by the data line(s). Field strengths and time periods such as those described above can be expected to be effective in this situation as well.

IV.B.2. Zwitterionic Groups

Zwitterionic groups on structure-forming particles also can be used to produce suspending medium suitable for inverse electrorheological gating techniques. If zwitterionic groups are not rigidly attached to the floc particle surface, but are on the free ends of lyophilic polymer chains, which themselves are chemisorbed to the particle surface, the zwitterionic groups can be relatively mobile. An AC voltage applied to capsules addressed by a select line tends to disrupt the floc network in the suspending medium of each capsule addressed by the select line because of the ability for movement of the zwitterionic groups. This disruption causes the particulate floc structure to liquefy while the AC voltage is applied. The floc network reforms in the absence of the AC voltage that is sufficient to disrupt the floc network. Structure-forming particles, in some embodiments, do not diffuse as quickly as polymer chains, but the use of very small colloidal particles can allow a reasonably fast reformation of the floc network when the AC field is removed or falls below a value sufficient to disrupt the network. Field strengths and time periods such as those described above can be expected to be effective in this situation as well.

IV.B.3. Dielectric Particles

Dielectric particles also can be used to advantage to create a floc network in a suspending medium for use as an inverse electrorheological fluid. In normal electrorheological fluids the dispersed dielectric particles line up between two electrodes under an applied AC field. Continuous strands form, creating significant resistance to any shearing motion perpendicular to the strands. Such fluids typically operate at a fairly high volume fraction of particles in order to attain a large yield stress. These dielectric particles can also be used to create inverse electrorheological fluids under certain conditions. For a short time after the AC field is applied, strings of flocculated dielectric particles are disrupted when the AC frequency is within a fairly narrow range, which depends on the particles. The cause of the disruption is the rotation of the particles that are not perfectly aligned perpendicular or horizontal to the field. (See, for example, Jones, T. B. Electromechanics of Particles, Cambridge University Press: New York, N.Y., 1995).

Thus, a dispersion of dielectric particles, at considerably lower volume fraction than found in normal electrorheological fluids, is used to create a particulate floc network with an appropriate yield stress. We then take advantage of this rotation phenomenon to disrupt the network by applying an AC electric field on the select lines at the correct amplitude and frequency. As with the other inverse electrorheological gating techniques, this application of the AC electric field liquefies the suspending medium in capsules located along the select line, and allows the charged pigment particles to move across the capsules when a DC field is applied to the data line(s).

V. Full Color Displays with Passive Matrix Addressing and Randomly Coated Capsules Using the inverse electrorheological gating techniques described above together with encapsulated electrophoretic display techniques, a full color display can be provided without having to precisely align the capsules of a display on an electrode grid or use a color mask. Several species of capsules are present in such a display with each species of capsule containing one or more pigments or one or more pigments and one or more dyes and being capable of displaying one member of the chosen color set and either white or black. The several species of capsules are mixed in the correct proportions and coated randomly on a film. There should preferably be multiple capsules of each color within each pixel area. It is not consequential how a particular color is produced in a particular type of capsule. Capsules that operate using a colored particle and a different color of dye, or capsules that operate using particles of more than one color, would all be acceptable. In an embodiment of the present invention, the colors of the chosen color set are in separate capsules, and each type of capsule corresponding to a particular color contains a different fluid phase so that the inverse electrorheological behavior of each species is different. This allows each species to be addressed independently, even though a plurality of different species of capsules are addressed by the same select line.

Each color is designed with its own threshold voltage amplitude and/or frequency. Thus, frequency controlled liquefaction allows the capsule medium to be switched for each color separately. Once the AC voltage drops below the threshold of a given color capsule, that color no longer responds to the data line signals. Consider a display having three colors. If amplitude control is used, the AC field is first set to the highest voltage, thus liquefying all capsule media on the selected line. The data lines would be set for the color with the highest threshold value. The voltage would then be decreased to the intermediate threshold value and the data lines set for the intermediate threshold color. The capsules corresponding to the color with the highest threshold would no longer respond to signals on data lines, thus fixing those pixels in the display state that they assumed under the highest AC field. Finally, the threshold would be set to the lowest value and the data lines set for the last color. During this third addressing step, the colors corresponding to the two higher thresholds would remain unaffected. This scheme can, of course, be extrapolated to the use of additional capsule types if so desired. Because these rheological gating techniques allow full color displays to be created using passive matrix addressing without the need to address individual capsules, the cost of the displays can be significantly reduced from other display techniques.

Figure 9:
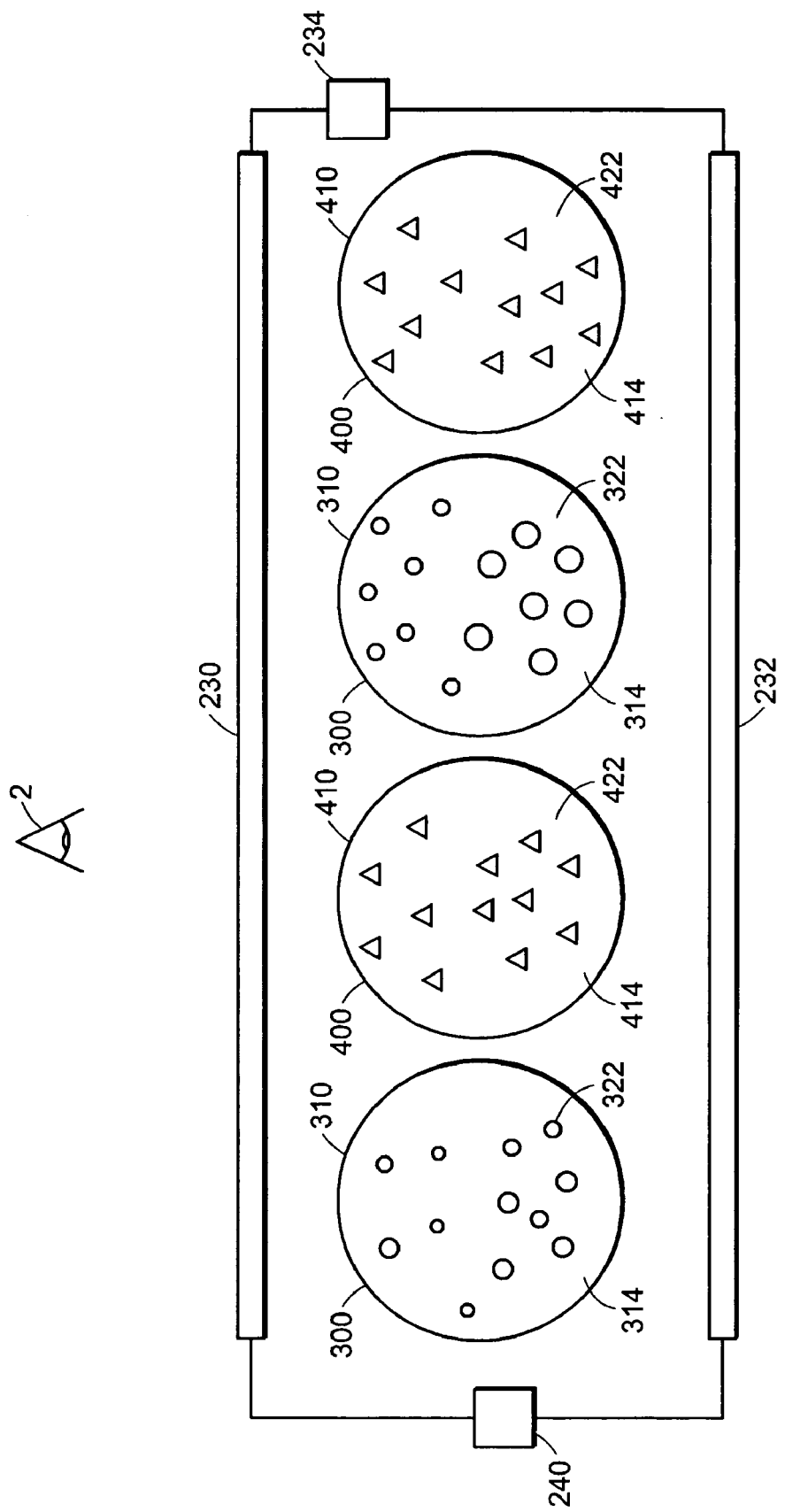
FIG. 9 shows a schematic depiction of a plurality of unaddressed capsules containing two different kinds particles and suspending fluids that have different threshold voltages, according to the invention.
Figure 10:
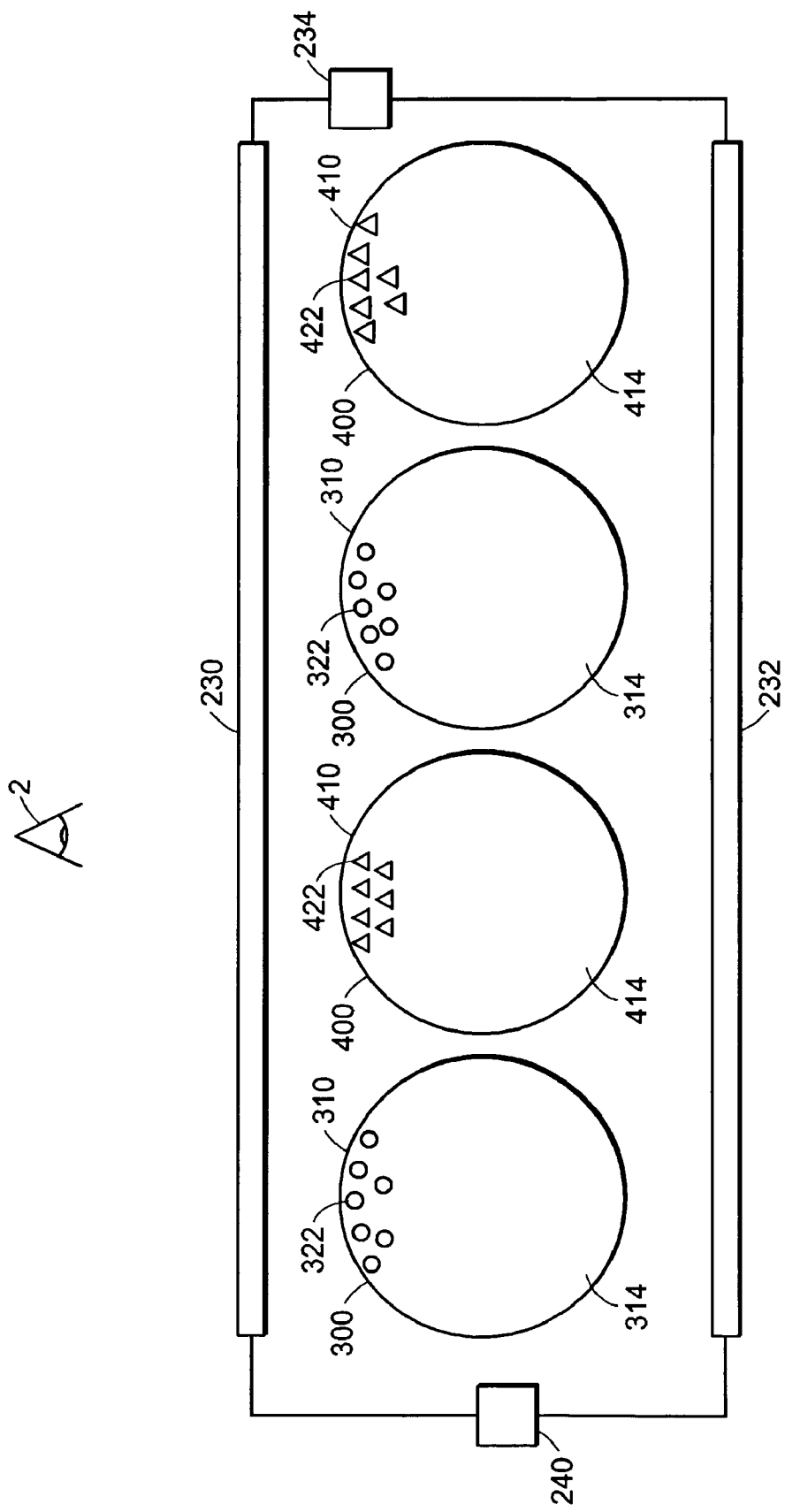
FIG. 10 shows a schematic depiction of a plurality of capsules containing two different kinds particles and suspending fluids that have different threshold voltages, that are addressed by a DC addressing signal and an AC field greater than the highest threshold voltage of the capsules, according to the invention.
Figure 11:
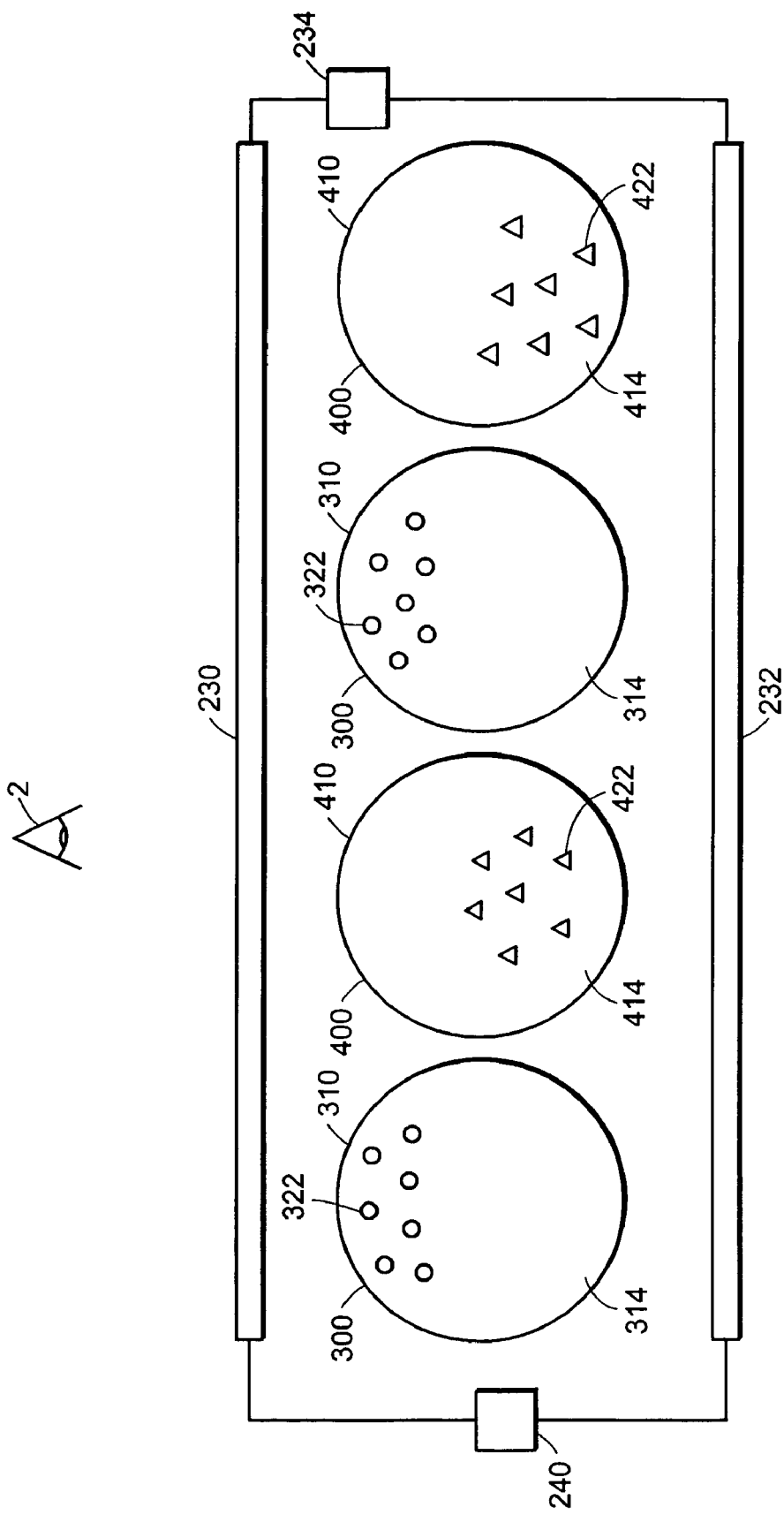
FIG. 11 shows a schematic depiction of a plurality of capsules containing two different kinds of particles and suspending fluids that have different threshold voltages, that are addressed by a DC addressing signal and an AC field above the threshold value corresponding to the lower threshold for either of the two kinds of particles, according to the invention.

Now referring to FIGS. 9, 10, and 11, a schematic depiction of an encapsulated electrophoretic display is shown. Two types of capsule 300, 400 are situated between two electrodes 230, 232. AC or DC voltage is produced by voltage generators 234, 240, respectively, and is applied to the capsules 300, 400 through the electrodes 230, 232. One of the types of capsules 300 is defined by a capsule wall 310 and contains a first suspending medium 314 and a first species of particle 322. The second type of capsule 400 also is defined by a capsule wall 410 and contains a second suspending medium 414, and a second species of particle 422. Each species of particle 322, 422 and respective suspending medium 314, 414 has a different threshold voltage characteristic. For example, suppose that the capsules 300 containing the particles 322 and the suspending fluid 314 have a threshold voltage $V_{300}$ and the capsules 400 containing the particles 422 and the suspending fluid 414 have a threshold voltage $V_{400}$, where $V_{400}$ is greater than $V_{300}$. For example, assume further that the particles 322 and 422 all carry charge of the same sign, whether positive or negative. In one embodiment, these different species of particle 322, 422 can represent, for example, two different colors. For example, the particles 322 can be red, and the particles 422 can be green. Suppose that the suspending fluids 314 and 414 are both colored black. A viewer 2 observes the display.

The suspending medium 314, 414 in each species of capsule 300, 400 is different such that an AC field at a value lower than $V_{400}$ and greater than $V_{300}$ can only liquefy one of the suspending media, namely 314. In that case, the DC field, when applied, would move the particles 322 only in the capsules 300 where the suspending medium 314 has liquefied.

An exemplary explanation of how amplitude control is used follows. In FIG. 9, none of the capsules have been addressed, and the particles 322, 422 are randomly distributed within their respective capsules. The AC field first is set to the highest voltage (i.e., a voltage that will liquefy all of the different suspending media, such as a voltage above $V_{400}$) and is applied to a particular select line in a region of the display to be addressed. The AC field liquefies all the suspending media 314 and 414 of the capsules 300, 400 along the selected line. The data lines are be set for the particles of the color with the highest threshold value for motion, (in the example, the particles 414) so as to address the capsules that are intended to be that color (i.e., capsules 400). Because all of the capsules 300, 400 contain liquefied suspending medium 314, 414, the particles 322, 422 in all of the capsules respond to the applied DC field. As shown in FIG. 10, all of the particles 322, 422 have moved toward the viewer 2. At this point, the viewer 2 sees a mixture of red and green particles.

The voltage is then dropped to a next highest threshold value (e.g., in the exemplary case, a voltage above $V_{300}$, but less than $V_{400}$) and a DC addressing field is applied to the data lines to address the particles having the color corresponding to the next highest threshold value (i.e., the particles 322). The capsules 400 that have a threshold voltage higher than the applied voltage would contain suspending fluid that is no longer liquefied, and the particles contained in the capsules 400 would not move in response to the DC voltage applied to the data lines. As shown in FIG. 11, a DC field of the polarity opposite to the polarity of the DC field that was applied in FIG. 10 is applied between the electrodes 230, 232. The particles 322 are caused to move in their capsules 300 so that the particles 32 are substantially removed from the side of the capsules 300 nearest the viewer 2. The net effect of these exemplary addressing steps is that a viewer 2 would see capsules 400 which appear substantially the color of the particles 422 (green) and capsules 300 which appear substantially the color of the suspending fluid 314 (black), for a net effect that appears green.

In the forgoing example, the sign of the charge on the two types of particles was assumed to be the same. If the charges are of opposite sign, one would only have to reverse the sense of one of the DC voltages applied to the data lines to obtain the same result by a stepwise process in which capsules having higher threshold voltage are addressed before capsule having a lower threshold voltage, the AC field is reduced, and the capsules having the next highest threshold voltage are addressed.

If a display containing more than two species of capsules is desired, one can iterate this process, finally setting the AC field to the lowest threshold value and addressing the particles corresponding to the last color by applying a DC voltage to the data lines. Once the AC voltage is set below the threshold of a given color capsule, the capsules of that color no longer respond to the data line signals. Because these rheological gating techniques allow full color displays to be created using passive matrix addressing without the need to address individual capsules, the cost of the displays can be significantly reduced as compared to the costs of manufacturing displays operating according to other addressing techniques.

In an alternative embodiment in which a frequency-controlled liquefaction of a suspending medium is used, the presence of two different suspending media 314, 414 that liquefy under different frequency excitations can allow separate switching of each color by controlling the frequency of the AC field that is applied. One can envision this embodiment also being extended to a number of species of capsule greater than two.

VI. Polymer and Colloidal Particle Design

Many of the techniques described above use functionalized polymers, surface modified pigment particles or surface modified floc network particles. The modification of the pigment and floc network particles can be achieved by grafting onto their surfaces molecules that are soluble in the suspending medium. For small particles (several nanometers to several 10's of nanometers in diameter) these molecules can be, for example, octyl through octadecyl hydrocarbon chains. For larger particles, polymers that are soluble in the suspending medium must be grafted to the particle surface. If this solvated material provides a sufficiently thick layer around the particles, a stable dispersion can be created in which the particles behave as hard spheres. That is, when two particles collide, they will not stick to each other on impact, but will move away and continue as separate particles. As the thickness of this solvated layer is reduced from this point, the attraction between the particles at closest approach increases. Thus, by reducing the thickness of this solvated layer, the floc networks form in a controlled way. By replacing a fraction of the grafted soluble chains with chains that include a functional group on the end, one can create particles with the controlled functionality discussed earlier.

The ion pair approaches for both polymeric and particle based networks require the selection of sterically hindered ions and/or ions with delocalized charge. Such ions dissociate in low dielectric constant fluids. For example, materials such as tetra-isoamylammonium picrate can be added to a hydrocarbon oil to increase the conductivity of the oil. The tetra-isoamylammonium ion is a highly hindered cationic ion. The charge on the picrate anion is not localized at the phenolic oxygen but is distributed over the PI-electron system of the whole molecule, resulting in a weak electrostatic force field leading to weak ion pairs. Also, the strength of the ion pair is a function of the dielectric constant of the solvent.

VII. Temperature Compensation of Threshold

The physical properties of the polymeric and particulate networks formed as well as the tendency for the ion pairs to dissociate in the embodiments above are functions of ambient temperature. Since the threshold voltage, the required AC electric field amplitude, and the required AC electric field frequency change with temperature, the above techniques work within a range of temperatures unless some adjustments are made. Because the phenomena are understood and their temperature behavior catalogued, the operating temperature range can be extended by monitoring the temperature of the display, and applying the fields at the amplitude and/or frequency required at that temperature. Although it is expected that to disrupt the network for the inverse electrorheological gating case, the required amplitude of the applied electric field decreases with increasing temperature, and the required frequency of the applied electric field increases with increasing temperature, the actual behavior will vary from system to system. The behavior of each specific system is characterized, and that information used to alter the amplitude and frequency of the applied field as a function of temperature.

VIII. Electrophoretic Ink Composed of Particles with Field Dependent Mobilities

Referring now to FIGS. 12–25, various embodiments that include particle types having field dependent mobilities are now described.

FIGS. 12A through 12G are graphs that illustrate the behavior of mobility versus applied electric field for various types, i.e., species or sets, of electrophoretic particles. Such particles may be, for example, pigment particles. Preferably, their mobility varies due to variations in particle charge induced by application of an electric field.

Figure 12A:
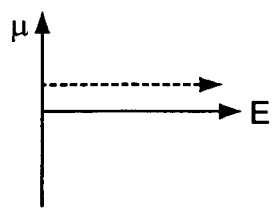
FIGS. 12A through 12H are graphs, which illustrate the behavior of mobility versus applied electric field for embodiments of various types of electrophoretic particles.

FIG. 12A illustrates the mobility of an embodiment of a single particle type having a constant mobility, of positive polarity. Applying a varying voltage to such a particle would proportionally vary the corresponding force applied to the particle. There is, however, no field-dependent effect on the mobility of the particle. A system of this type may be prepared by dispersing a pigment (a surface treated carbon black with a polymer shell) in a solution of SOLSPERSE 17000 (Avecia, Inc., Wilmington, Del.) in a 1:1 mixture by weight of ISOPAR G (ExxonMobil Lubricants & Petroleum Specialties Company) and HALOCARBON 1.8 (Halocarbon Products Corporation, River Edge, N.J.).

Figure 12B:
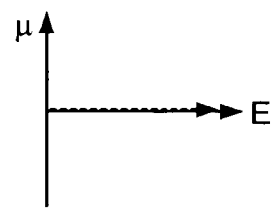

FIG. 12B illustrates the mobility of an embodiment of a single particle type having a constant, zero mobility. This particle type has no charge, so application of an electric field creates no force on the particles, and no corresponding movement. Such particles may maintain their locations with a display medium, subject to gravitational and other forces, and may contribute to an optical characteristic, if, for example, they are viewable by an observer of a display. A system of this type may be prepared by dispersing TiPure R960 in a 1:1 mixture by weight of ISOPAR G (ExxonMobil Lubricants & Petroleum Specialties Company) and HALOCARBON 1.8 (Halocarbon Products Corporation, River Edge, N.J.).

Figure 12C:
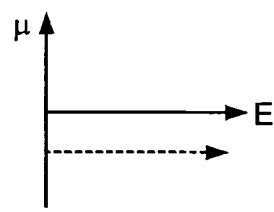

FIG. 12C illustrates the mobility of an embodiment of a single particle type having a constant mobility, of negative polarity. Applying a varying voltage to such a particle would proportionally vary the corresponding force applied to the particle. For a given electric field, the direction of motion of these particles would be opposite to that for particles having the mobility illustrated in FIG. 12A. Particles having mobilities of opposite polarity experience forces of opposite directions for a given field, i.e., one parallel and the other anti-parallel to the field. A system of this type may be prepared by dispersing a pigment (a silane treated, silica clad TiO2 with a polymer shell) in a solution of SOLSPERSE 17000 (Avecia, Inc., Wilmington, Del.) and SPAN 85 (Aldrich Chemical Company Inc.) in a mixture by weight of ISOPAR G (ExxonMobil Lubricants & Petroleum Specialties Company) and HALOCARBON 1.8 (Halocarbon Products Corporation, River Edge, N.J.).

Figure 12D:
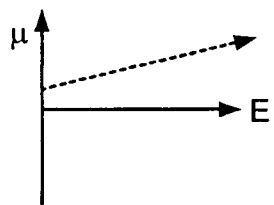

FIG. 12D illustrates the mobility of an embodiment of a single particle type having an increasing, linearly varying mobility, of positive polarity. Applying a varying voltage to such a particle type generates a force that increases with field strength at a greater rate than for a particle with constant mobility. These particles may have a charge that increases due to increases in the electric field strength.

Figure 12E:
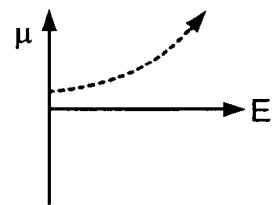

FIG. 12E illustrates the mobility of an embodiment of a single particle type having an increasing, non-linearly varying mobility, of positive polarity. Applying a varying voltage to such a particle type would generate a force that increases with field strength at a rate that increase with applied field strength. These particles may have a charge that increases due to increases in the electric field strength. A charge-increasing effect may grow more pronounced as the field strength increases.

Figure 12F:
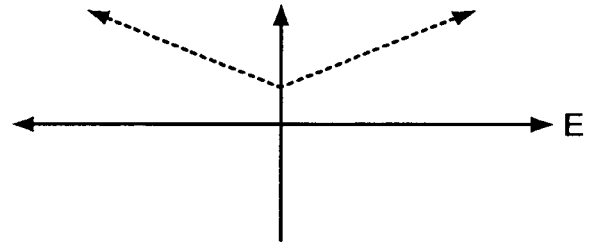

FIG. 12F illustrates the mobility of an embodiment of a single particle type having an increasing, linearly varying mobility, of positive polarity. The mobility of this particle type is similar to that illustrated in FIG. 12D.

Figure 12G:
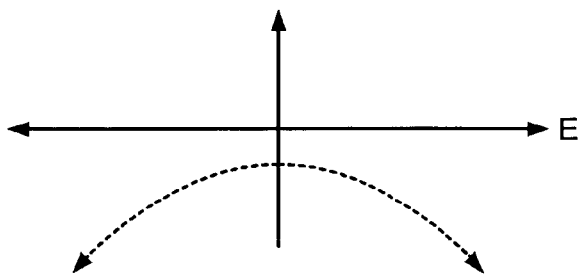

The mobility at negative field is, as graphed, a mirror image of the mobility at positive fields, negative and positive referring to electric fields of opposite directions. Similarly, FIG. 12G illustrates the mobility of an embodiment of a single type of particle, at positive and negative fields. The mobility in this case has a negative polarity at all voltages, and again has the same value, i.e. magnitude, for negative and positive polarity fields of the same magnitude.

The mobility is a function of field strength, and not field direction, i.e., field polarity. Thus, the mobility is isotropic relative to direction of application of an electric field. The direction of the field determines the direction of the corresponding applied force, while the magnitude of the field determines the magnitude of the mobility.

Figure 12H:
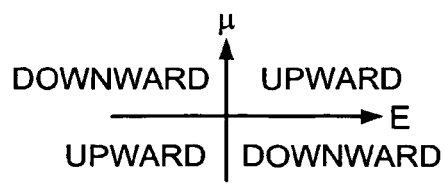

If one defines a positive field direction as a direction pointing to a viewing surface of a display, then a negative direction points away from the viewing surface. This convention will be assumed for the following descriptions. Given this convention, FIG. 12H illustrates the direction of particle motion, given a knowledge of the polarity of the particle mobility and the polarity of the applied field.

Particles having a positive polarity will tend to move toward the viewing surface when subjected to a field of positive polarity (upper right quadrant). Particles having a positive polarity will tend to move away from the viewing surface when subjected to a field of negative polarity (upper left quadrant). Particles having a negative polarity will tend to move toward the viewing surface when subjected to a field of negative polarity (lower left quadrant). Particles having a negative polarity will tend to move away from the viewing surface when subjected to a field of positive polarity.(lower right quadrant).

FIGS. 13 through 25 each illustrate various exemplary embodiments of a display medium for inclusion in an image pixel. These embodiments serve to illustrate features of the invention, rather than provide a comprehensive listing of implementations. For simplicity, different particle types are referred to with the letters "A", "B", "C", "D" and "E". Use of these indicia does not imply that A particles, for example, in one embodiment are identical to A particles in another embodiment.

Further, display media, in the following, are illustrated as encapsulated, including a capsule membrane or wall. The representation of a capsule membrane is not intended to be limiting because the invention is applicable to unencapsulated electrophoretic display media. An image pixel may, however, include one or more capsules.

A display medium may include a carrier medium, for example, a fluid. The capsule and the display medium may include various materials in various embodiments, and be formed by various processes, as described elsewhere in this Description.

Figure 13A:
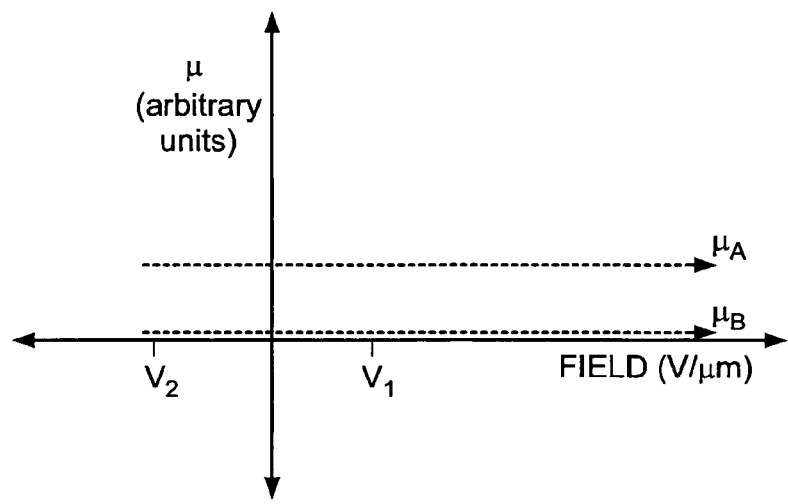
FIG. 13A is a graph that shows the mobility of embodiments of two types of particles having constant mobilities.

FIG. 13A is a graph that shows the mobility of a neutral particle, type B, and the mobility of a particle, type A, having a constant, positive polarity. A field arises due to application of a voltage to an image pixel that includes the particles.

Figure 13B:
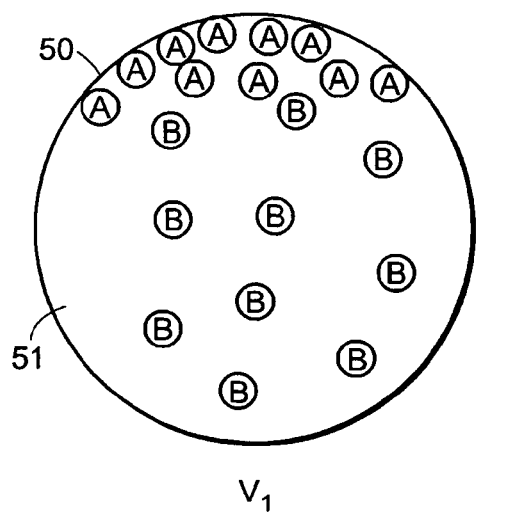
FIG. 13B illustrates the behavior of particles corresponding to the embodiment of FIG. 13A, when a positive voltage is applied to the display medium.

FIG. 13B illustrates the behavior of particles A and B when a positive voltage V1 is applied to the display medium. Particles A move upward, toward a viewing surface of a display. Particles B are not affected by the applied voltage. Hence, particles A determine an optical characteristic of the display.

Figure 13C:
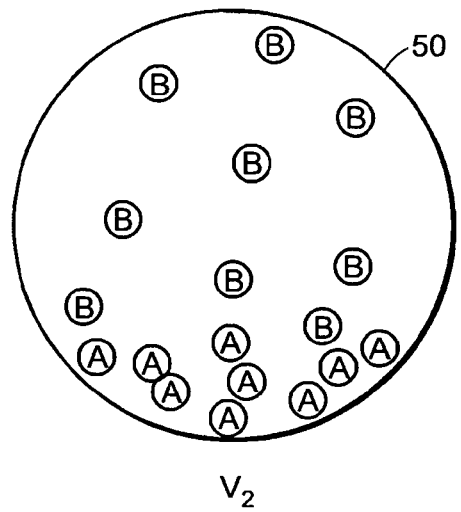
FIG. 13C illustrates the behavior of the particles corresponding to the embodiment of FIG. 13A, when a negative voltage is applied to the display medium.

FIG. 13C illustrates the behavior of the particles when a negative voltage V2 is applied to the pixel. Particles A are driven to the bottom surface of a capsule 50, while the neutral particles B are unaffected by the applied field. Hence, an image characteristic is determined by the particles B, which are seen from the viewing surface. The particles B may also block a user's view of particles A.

With application of no voltage, the particles A and B may intermingle to produce a third, neutral image characteristic for the pixel. The particles A and B may be variously colored to enable the pixel to present various image characteristics. For example, A-type particles may be white, while B-type particles may be black. Alternatively, the particles may be colored.

Further, the display medium may include a carrier medium 51, which may be transparent, translucent or opaque. The carrier medium 51 may be colored. Thus the carrier medium 51 may contribute to an optical characteristic of the pixel, in particular when no particles are clustered near the viewing surface. If it is desired that only particles A or B contribute to an optical characteristic of a pixel, the carrier medium 51 may be optically clear.

Figure 14A:
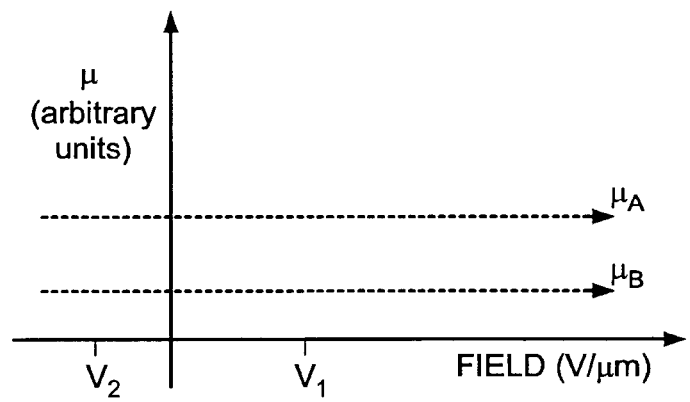
FIG. 14A is a graph that shows the mobility of a particle embodiment having a constant, positive mobility, and a second particle embodiment having a constant, though lower, positive mobility.

FIG. 14A is a graph that shows the mobility of a particle A having a constant, positive mobility, and a second particle B having a constant, though lower, positive mobility.

Figure 14B:
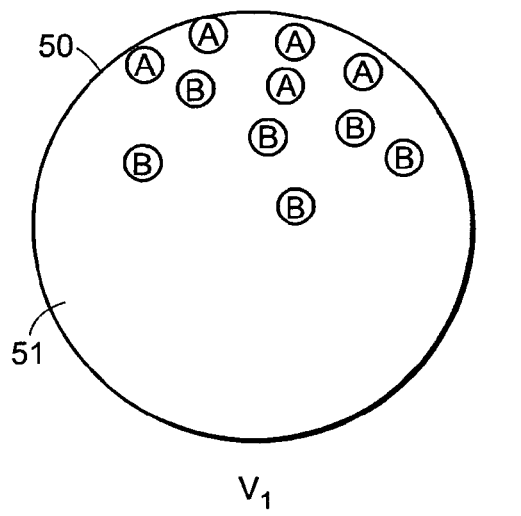
FIGS. 14B and 14C illustrate the behavior of particles corresponding to FIG. 14A when, respectively, a positive voltage or a negative voltage is applied to the display medium.
Figure 14C:
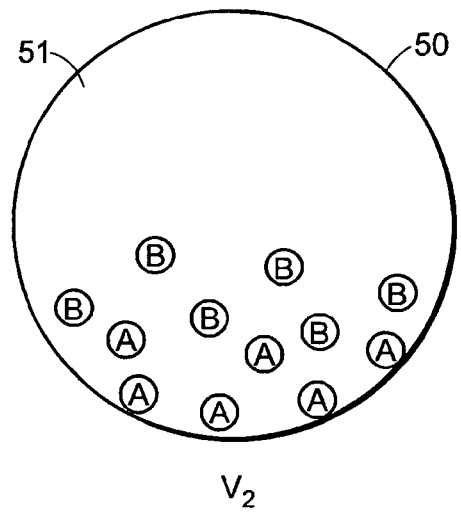

FIGS. 14B and 14C illustrate the behavior of the particles when, respectively, a positive voltage V1 or a negative voltage V2 is applied to the display medium.

Particles A move more rapidly than particles B, at any applied voltage. Hence, a positive voltage causes particles A to cluster towards a top surface prior to the arrival of particles B. Similarly, a negative voltage causes particles A to cluster towards a bottom surface prior to the arrival of particles B. Thus, at V1, particles A may be seen by a viewer of the display, while at V2, particles B may be seen. Particles A may then determine an optical characteristic of a pixel due to application of V1, and particles B may determine an optical characteristic due to application of voltage V2.

Again, when no voltage is applied to the pixel, the particles A and B may intermingle to produce a third, neutral image characteristic for the pixel. For example, a neutral state may have a grey appearance if particles A are white and particles B are black.

Figure 15A:
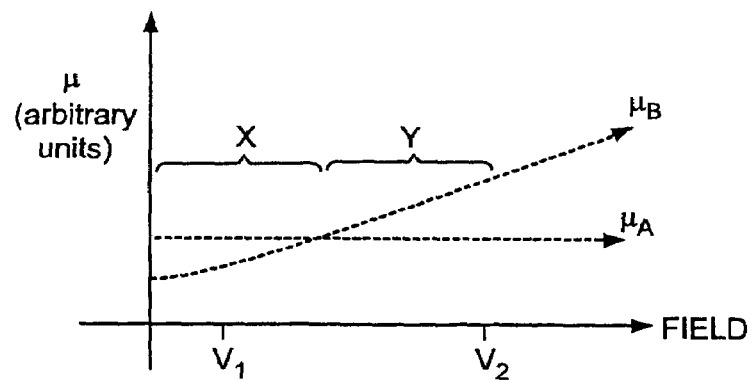
FIG. 15A is a graph of the mobility of a particle embodiment having a constant, positive polarity, and a second particle embodiment having a linearly increasing, positive mobility.

FIG. 15A is a graph that shows the mobility of a particle A having a constant, positive polarity, and a second particle B having a linearly increasing, positive mobility. The mobility of particles A is greater than the mobility of particles B over a lower voltage range, indicated by "X" in the graph. The mobility of particles A is lower than the mobility of particles B over a higher voltage range, indicated by "Y".

Figures 15B, 15C:
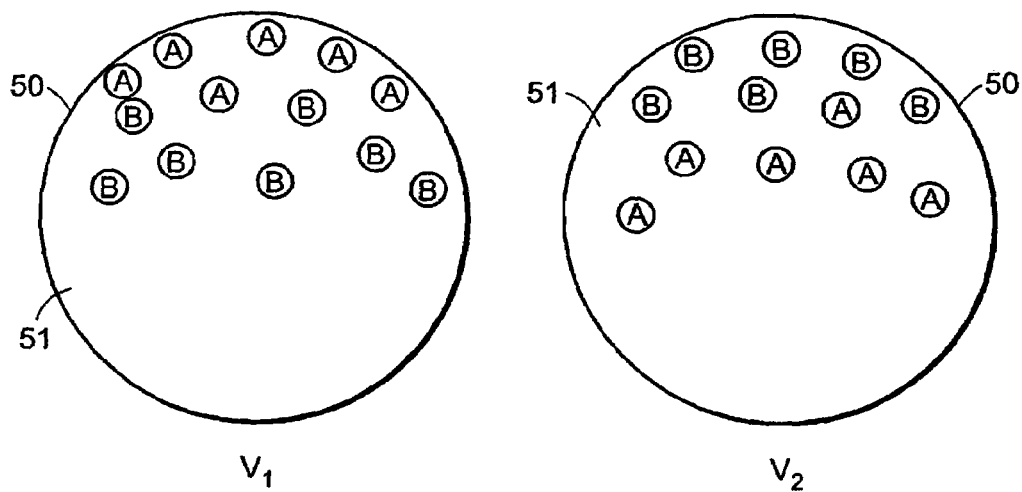
FIGS. 15B and 15C illustrate the behavior of particles corresponding to FIG. 15A, when different voltages are applied.

FIGS. 15B and 15C illustrate the behavior of the particles when, respectively, a voltage V1 within range X, or a voltage V2 within range Y, is applied to the display medium.

Particles A move upward more rapidly than particles B, at V1. Particles A then cluster towards the top surface prior to the arrival of particles B. Application of V2 causes particles B to cluster towards the top surface prior to the arrival of particles A. Thus, at V1, particles A may be seen by a viewer of the display, while at V2, particles B may be seen. Particles A may then determine an optical characteristic of a pixel due to application of V1, and particles B may determine an optical characteristic due to application of voltage V2.

Negative voltages may be applied, as described with respect to FIG. 14, to vary the optical state.

FIG. 16A is a graph that shows the mobility of particles A and particles B, where both types have a linearly increasing, positive mobility. At lower voltages, the mobility of particles A is greater than the mobility of particles B. At higher voltages, the mobility of particles A is lower than the mobility of particles B.

FIGS. 16B and 16C illustrate the behavior of the particles when, respectively, a lower voltage V1 is applied or when a higher voltage V2 is applied to a display medium containing the particles.

Particles A move upward more rapidly than particles B, at V1. Particles A then cluster towards the top surface prior to the arrival of particles B. Application of V2 causes particles B to cluster towards the top surface prior to the arrival of particles A.

Thus, at V1, particles A may be seen by a viewer of the display, while at V2, particles B may be seen. Particles A may then determine an optical characteristic of a pixel due to application of V1, and particles B may determine an optical characteristic due to application of voltage V2.

Figure 17A:
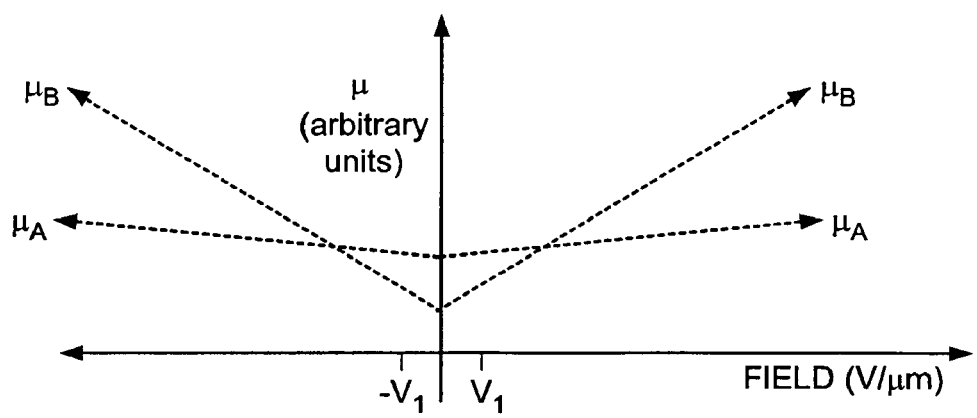
FIG. 17A is a graph that shows the mobility of embodiments of two particle types, where both types have a linearly increasing, positive mobility, similar to that illustrated in FIG. 16.

FIG. 17A is a graph that shows the mobility of particles A and particles B, where both types have a linearly increasing, positive mobility, similar to the embodiment illustrated in FIG. 16. The mobilities of the particles at negative voltages are shown as a mirror image of the mobilities of the particles at positive voltages.

Figure 17B:
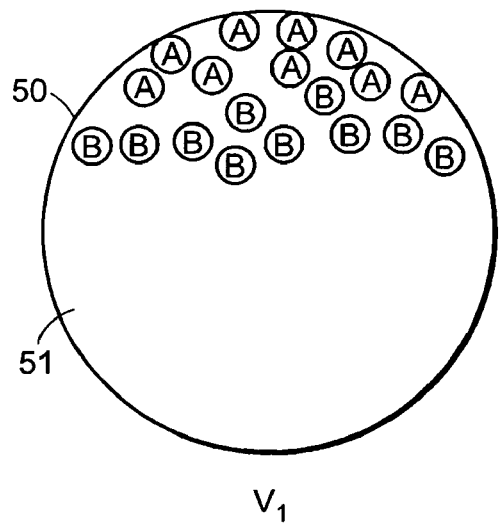
FIGS. 17B and 17C illustrate the behavior of particles corresponding to FIG. 17A, when a positive voltage or a negative voltage is applied.
Figure 17C:
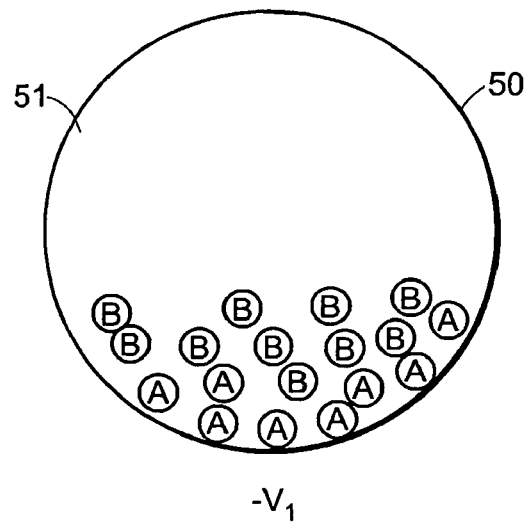

FIGS. 17B and 17C illustrate the behavior of the particles when, respectively, a positive voltage V1 is applied or when a negative voltage –V1 is applied. The voltage –V1 has the same magnitude as V1, though of opposite polarity.

Particles A move more rapidly than particles B, at both V1 and –V1. Only the direction of movement is affected by the polarity change of the applied, equal magnitude voltages.

At V1, particles A cluster towards the top surface prior to the arrival of particles B. Hence, particles A may dominate the optical characteristic of the display medium.

At –V1, particles A cluster towards the bottom surface prior to the arrival of particles B. Hence, particles B may then dominate the optical characteristic of the display medium.

Various other positive or negative polarity voltages may be applied to drive either A or B particles first to either the top or bottom surface. Further, a carrier medium 51 may contribute to a third optical characteristic of the display medium. For example, a colored or grey-level carrier medium 51 may dominate the appearance of the display medium when the particles are driven to the bottom surface, or when the particles are dispersed within the carrier medium 51.

Figure 18A:
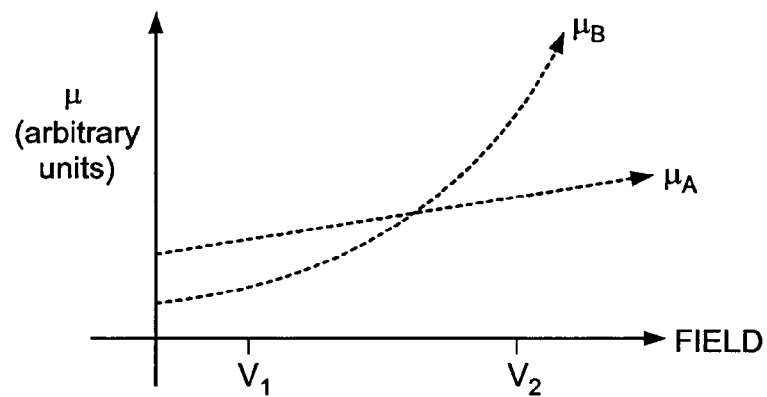
FIG. 18A is a graph that shows the mobility of embodiments of two types of particles.

FIG. 18A is a graph that shows the mobility of particles A and particles B. Particles A have a linearly increasing, positive mobility. Particles B have a non-linear, positive mobility, with the rate of increase of mobility increasing with increasing voltage. The mobility of particles A is greater than the mobility of particles B at lower voltages.

Figures 18B, 18C:
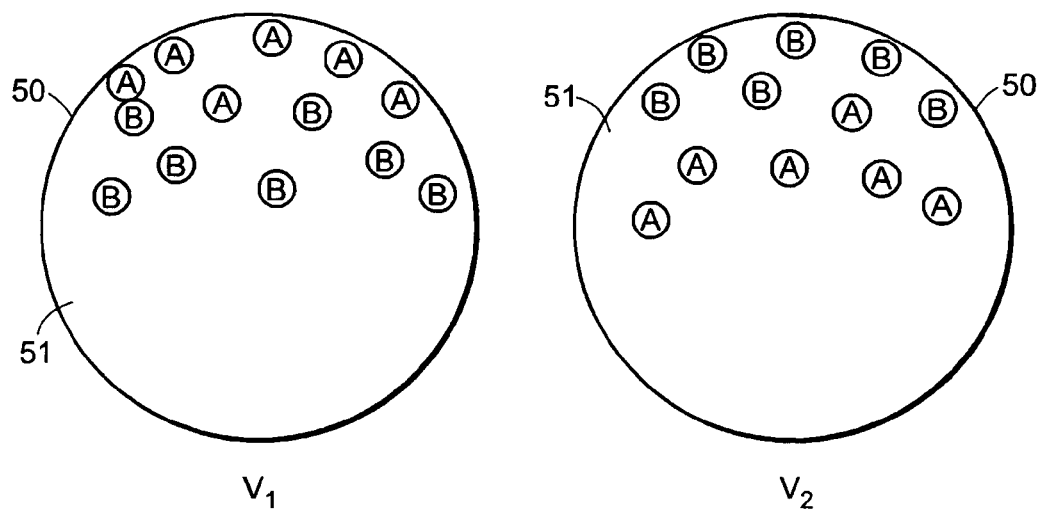
FIGS. 18B and 18C illustrate the behavior of particles corresponding to FIG. 18A when, respectively, a lower voltage or a higher voltage is applied.

FIGS. 18B and 18C illustrate the behavior of the particles when, respectively, a lower voltage V1 is applied or when a higher voltage V2 is applied.

Particles A move upward more rapidly than particles B, at V1. Particles A then cluster towards the top surface prior to the arrival of particles B. Application of V2 causes particles B to cluster towards the top surface prior to the arrival of particles A.

FIG. 19A is a graph that shows the mobility of particles A and particles B. Particles A have a non-linear, increasing positive mobility, with the rate of increase of mobility decreasing at higher voltages. Particles B have a non-linear, positive mobility, with the rate of increase of mobility increasing at higher voltages. The mobility of particles A is greater than the mobility of particles B at lower voltages.

FIGS. 19B and 19C illustrate the behavior of the particles when, respectively, a lower voltage V1 is applied or when a higher voltage V2 is applied.

Particles A move upward more rapidly than particles B, at V1. Particles A then cluster towards the top surface prior to the arrival of particles B. Application of V2 causes particles B to cluster towards the top surface prior to the arrival of particles A.

FIG. 20A is a graph that shows the mobility of three types of particles, denoted A, B and C. Particles A have a constant, positive mobility. Particles B have a linearly increasing, positive mobility. Particles C have a non-linear, positive mobility. The mobility of particles A is greater than that of B and C at lower voltages. The mobility of particles B is greater than that of particles A and C at intermediate voltages, and the mobility of particles C is greatest at higher voltages.

FIGS. 20B, 20C and 20D illustrate the behavior of the particles when, respectively, a lower voltage V1, an intermediate voltage V2 or a higher voltage V3 is applied.

Particles A move upward most rapidly of the three particle types when V1 is applied. Particles A then cluster towards the top surface prior to the arrival of particles B and C. Thus, particles A may dominate the optical state at lower applied voltages.

Application of V2 causes particles B to cluster towards the top surface prior to the arrival of particles A and C. Particles B may dominate the optical state at intermediate applied voltages.

Application of V3 causes particles C to cluster towards the top surface prior to the arrival of particles A and B. Particles C may dominate the optical state at higher applied voltages.

The different particle types may have different colors and/or grey-levels to enable the display of color and/or grey levels by an image pixel. For example, particles A, B and C may respectively be red, green and blue to enable a color display. Thus, a single pixel, addressed by a single voltage, at any one time, may display a variety of colors or grey levels.

A suspending medium 51 may be included, and provided with an optical characteristic to dominate the appearance of an image pixel when particles A, B and C are dispersed or driven towards the bottom surface. For example, the suspending medium 51 may be black to provide a black "off" state for the image pixel. Alternatively, the suspending medium 51 may have a color to enable the display of a fourth color by an image pixel.

Alternatively, the particles may be addressed with a voltage at which two or more sets of particles have an equal or similar mobility. The appearance of the image pixel may then be dominated by a combination of the two or more particle types appearing at the surface of the pixel. This technique may provide a color and/or a grey-level not provided alone by any one particle type, or by the suspending medium 51, in the image pixel.

Figure 21A:
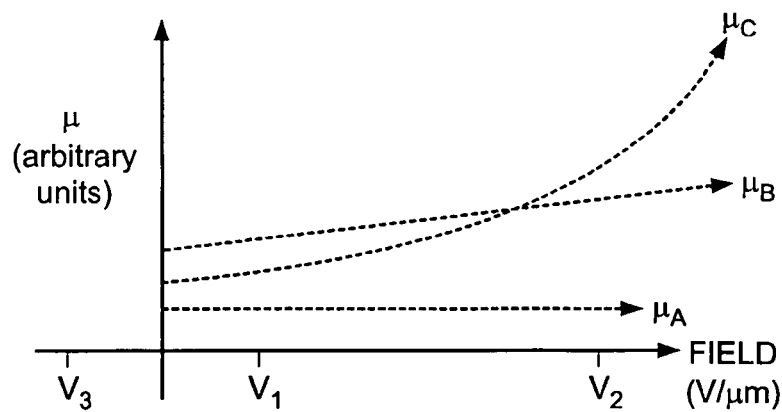
FIG. 21A is a graph that shows the mobility of embodiments of three types of particles.

FIG. 21A is a graph that shows the mobility of three types of particles, denoted A, B and C. Particles B have a linearly increasing, positive mobility. Particles C have a non-linear, positive mobility. Particles A have a constant, positive mobility, which is less than the mobility of particles A and B at all voltages. The mobility of particles B is greater than that of particles C at lower voltages, and the mobility of particles C is greatest at higher voltages.

Figure 21B:
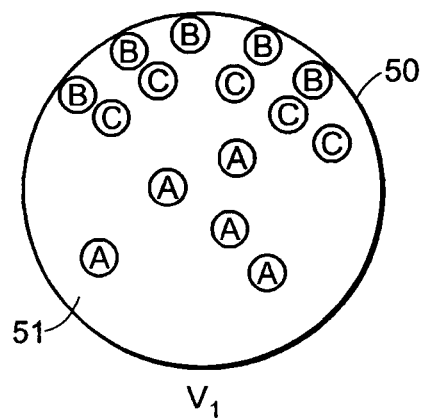
FIGS. 21B, 21C and 21D illustrate the behavior of particles corresponding to FIG. 21A, in response to the application of different electric fields.
Figure 21C:
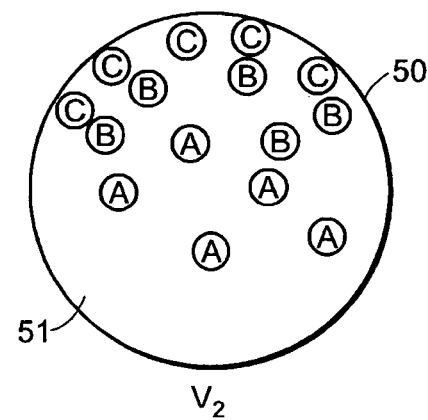
Figure 21D:
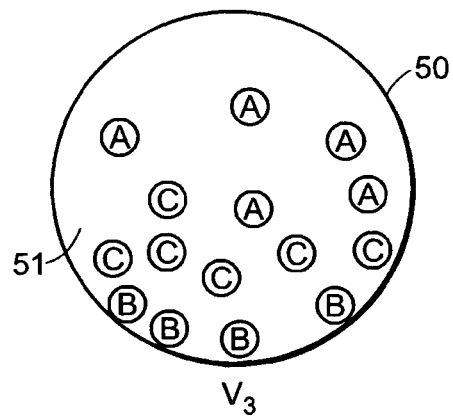

FIGS. 21B, 21C and 21D illustrate the behavior of the particles when, respectively, a lower positive voltage V1, a higher positive voltage V2 or a negative voltage V3 is applied.

Particles B move upward most rapidly of the three particle types when V1 is applied. Particles B then cluster towards the top surface prior to the arrival of particles A and C. Thus, particles B may dominate the optical state at lower applied voltages.

Application of V2 causes particles C to cluster towards the top surface prior to the arrival of particles A and B. Particles C may dominate the optical state at intermediate applied voltages.

Application of negative voltage V3 causes all particle types A, B and C to migrate toward the bottom surface of, for example, capsule 50. Particles B and C move most rapidly towards the bottom surface. Thus, lagging particles C dominate the optical characteristic of the image pixel because they are observed from the viewing surface.

The different particle types may have different colors and/or grey-levels to enable the display of color and/or grey levels by an image pixel. A suspending medium 51 may be included, and provided with an optical characteristic to dominate the appearance of an image pixel when particles A, B and C are dispersed or driven towards the bottom surface.

Figure 22A:
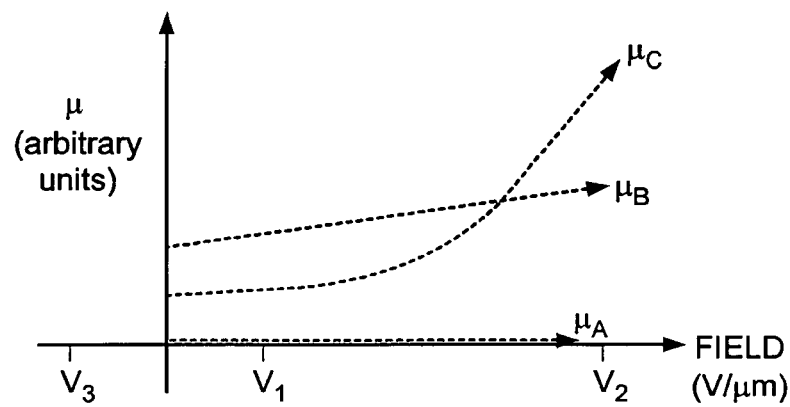
FIG. 22A is a graph that shows the mobility of embodiments of three types of particles.

FIG. 22A is a graph that shows the mobility of three types of particles, denoted A, B and C. Particles B have a linearly increasing, positive mobility. Particles C have a non-linear, positive mobility. Particles A have a constant, zero mobility, i.e., particles A are charge-neutral. The mobility of particles B is greater than that of particles C at lower voltages, and the mobility of particles C is greatest at higher voltages.

Figure 22B:
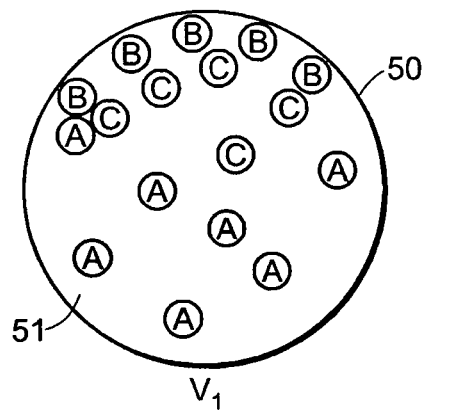
FIGS. 22B, 22C and 22D illustrate the behavior of particles corresponding to FIG. 22A, in response to the application of different electric fields.
Figure 22C:
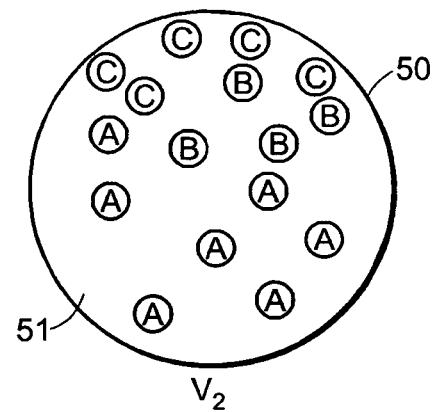
Figure 22D:
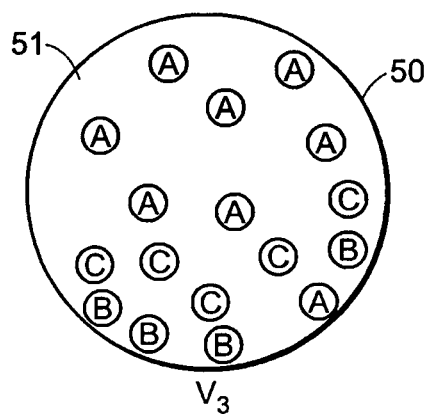

FIGS. 22B, 22C and 22D illustrate the behavior of the particles when, respectively, a lower positive voltage V1, a higher positive voltage V2 or a negative voltage V3 is applied.

Particles B move upward when V1 is applied. Particles B then cluster towards the top surface prior to the arrival of particles C. Particles A are unaffected by application of a voltage. They remain, for example, dispersed throughout the display medium. Thus, particles B may dominate the optical state at lower applied positive voltages.

Application of V2 causes particles C to cluster towards the top surface prior to the arrival of particles B. Particles C may then dominate the optical state at higher applied positive voltages.

Application of negative voltage V3 causes particle types B and C to migrate toward the bottom surface of a image pixel. Particles A may remain dispersed in the display medium. Thus, particles A may dominate the optical characteristic of the image pixel because they may be observed from the viewing surface, and shield the view of particles B and C.

Figure 23A:
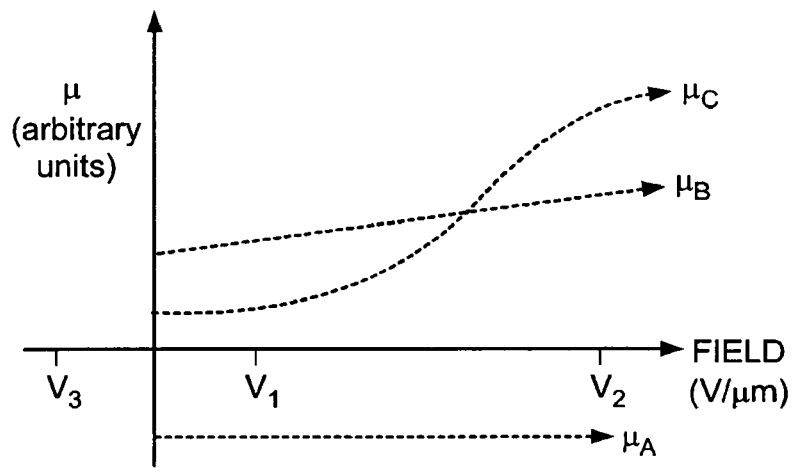
FIG. 23A is a graph that shows the mobility of embodiments of three types of particles.

FIG. 23A is a graph that shows the mobility of three types of particles, denoted A, B and C. Particles B have a linearly increasing, positive mobility. Particles C have a non-linear, positive mobility. Particles A have a constant, negative mobility. The mobility of particles B is greater than that of particles C at lower voltages, and the mobility of particles C is greater than that of particles B at higher voltages. Particles A move in a direction opposite to that of particles B and C in response to the application of an electric field.

Figure 23B:
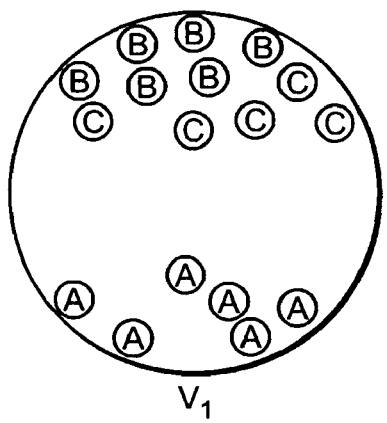
FIGS. 23B, 23C and 23D illustrate the behavior of particles corresponding to FIG. 23A, in response to the application of different electric fields.
Figure 23C:
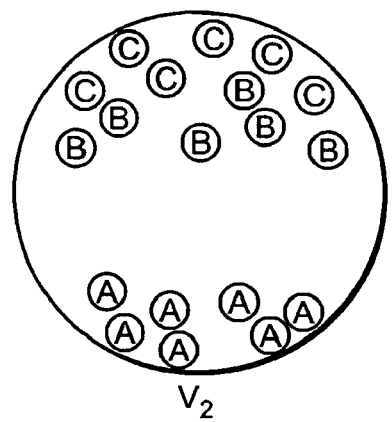
Figure 23D:
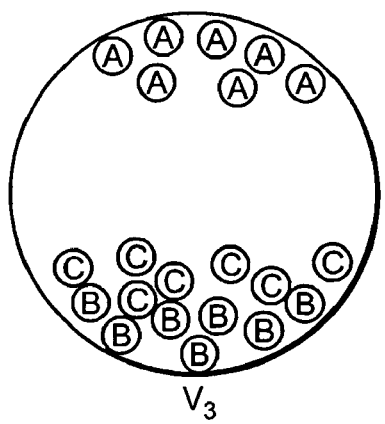

FIGS. 23B, 23C and 23D illustrate the behavior of the particles when, respectively, a lower positive voltage V1, a higher positive voltage V2 or a negative voltage V3 is applied.

Particles B move upward when V1 is applied. Particles B then cluster towards the top surface prior to the arrival of particles C. Particles A move toward the bottom surface. Thus, particles B may dominate the optical state at lower applied positive voltages.

Application of V2 causes particles C to cluster towards the top surface prior to the arrival of particles B. Particles C may then dominate the optical state at higher applied positive voltages. Particles A again move downward, away from the viewing surface.

Application of negative voltage V3 causes particle types B and C to migrate toward the bottom surface of an image pixel. Particles A move toward the viewing surface, and cluster near the top of the display medium. Thus, particles A may dominate the optical characteristic of the image pixel.

Figure 24A:
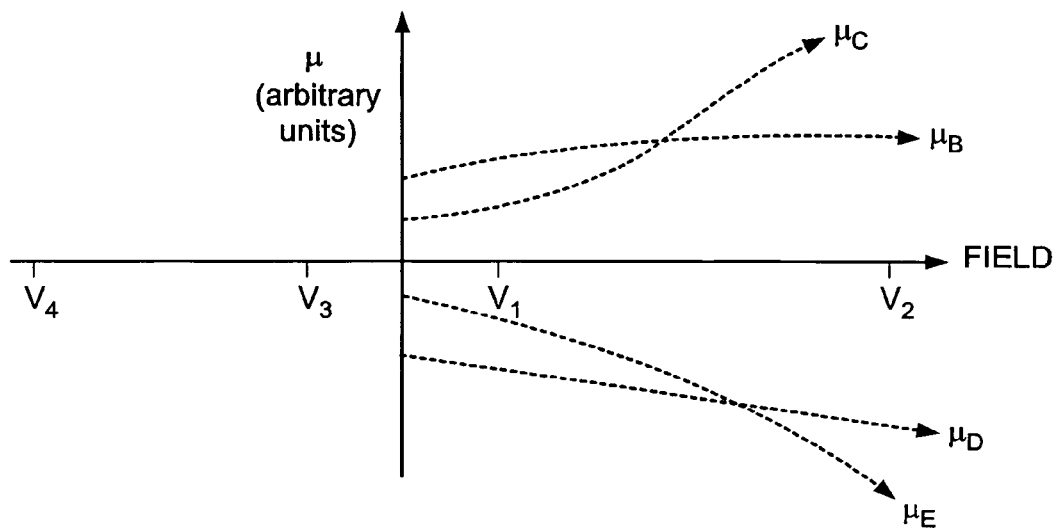
FIG. 24A is a graph that shows the mobility of embodiments of four types of particles.
Figure 24B:
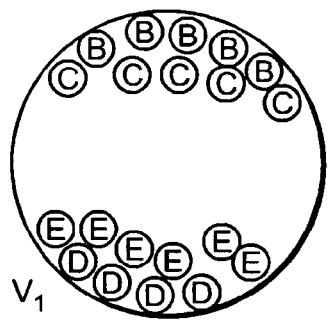
FIGS. 24B through 24E illustrate the behavior of particles corresponding to FIG. 24A, in response to the application of positive and negative polarity electric fields.
Figure 24C:
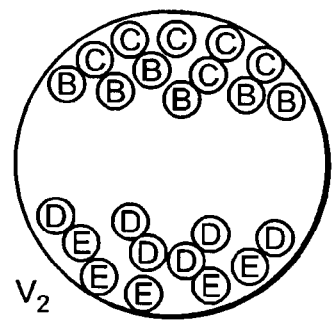
Figure 24D:
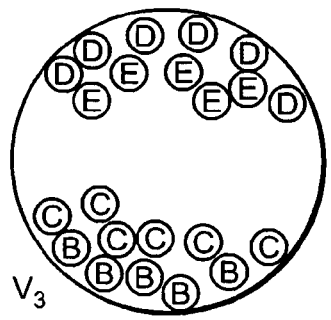
Figure 24E:
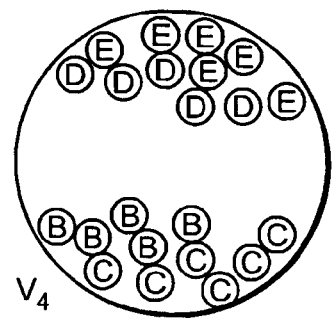

FIG. 24A is a graph that shows the mobility of four types of particles B, C, D and E, all included in a single display medium within an image element. Particles B and C have non-linear, increasing positive mobilities. Particles D and E have non-linear, negative mobilities of increasing magnitude. The mobility of particles B is greater than the mobility of particles C at lower voltages. The magnitude of the mobility of particles D is greater than the magnitude of the mobility of particles E at lower magnitude voltages.

FIGS. 24B through 24E illustrate the behavior of the particles when, respectively, a lower positive voltage V1, a higher positive voltage V2, a smaller negative voltage V3 or a larger negative voltage V4 is applied.

Particles B move upward more rapidly than particles C, at V1, while particles C move more rapidly at V2. Particles D and E move downward at these positive voltages. Conversely, particles D move upward more rapidly than particles E, at V3, while particles E move upward more rapidly at V4. Particles B and C move downward at these negative voltages.

Hence, at voltages V1, V2, V3 and V4, particles B, C, D and E respectively cluster at an upper surface and may dominate the appearance of an image pixel that includes the display medium.

Use of four particle types, each type having a different color, enables, for example, a four-color image pixel. As described for other embodiments, a colored suspending medium 51 may provide another color. Further, combinations of particles clustered toward the viewing surface may enable the display of still other colors by a single image pixel. Alternative embodiments include particles colored black or white, or an intermediate shade of grey.

Some embodiments of a display medium include particles formed from pigment having a charge that varies with applied electric field. The following describes three exemplary pigment dispersion systems, for which two have a mobility magnitude that increases with increasing field, and one that has a mobility that is independent of the field.

Mobility may be expressed as $\mu = v/\vec{E}$, where $v$ is the electrophoretic velocity as discussed earlier and $\vec{E}$ is the applied electric field. A measure of the pigment mobility can be obtained in one of several ways. Though mobility can be measured directly, direct measurement may not be simple for non-polar media, such as the non-polar media discussed here. For example, mobility can also be calculated from a measured value of the charge-to-mass ratio, Q/M, of the particles or from a measured value of the difference in conductivity of the dispersion, $\lambda$, and its serum, $\lambda_0$. The relationship of the mobility to zeta potential, charge-to-mass ratio, and conductivity is discussed in Morrison, I. D. and Tarnawskyj, C. J., *Langmuir* 1991, 7, 2358.

In the non-polar systems discussed here, the mobility, $\mu$, is related to the zeta potential by $$\mu = \frac{2\varepsilon_r \varepsilon_0 \zeta}{3\eta} \tag{12}$$

Given the charge-to-mass ratio, the mobility is given by $$\mu = \frac{\rho_p d_p^2}{18\eta} \frac{Q}{M} \qquad (13)$$

Given the conductivity of the dispersion and its serum, the mobility is given by $$\mu = \left(\frac{\rho_p d_p^2}{18\eta \rho_{sl} w_p}\right)^{\frac{1}{2}} \sqrt{\lambda - \lambda_0} \qquad (14)$$

Figure 25:
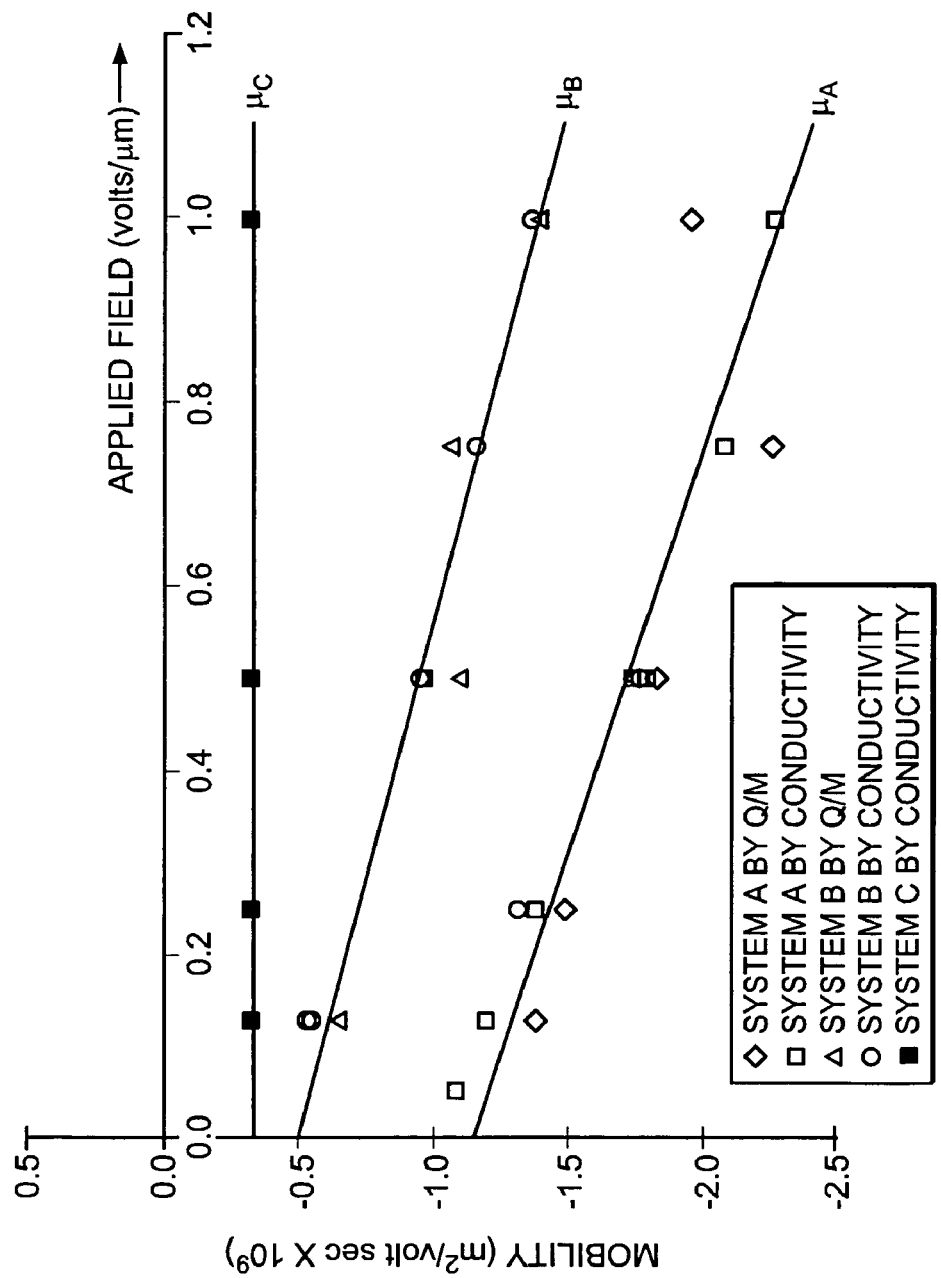
FIG. 25 is a graph of particle mobility versus applied field for three exemplary pigment systems.

FIG. 25 is a graph of pigment mobility versus applied field for the three exemplary pigment systems. The curve labeled as $\mu_A$ illustrates the behavior of the mobility of the particles in System A. The mobility values for this curve were obtained either by measuring the charge-to-mass ratio, Q/M, and calculating the mobility with Equation 13, or by measuring the conductivities of the dispersion and serum and calculating the mobility with Equation 14. System A was prepared by dispersing TI-PURE R-104 (an organosilane treated $TiO_2$ from E.I. du Pont de Nemours Company) in a solution of OLOA 371 (Chevron Oronite Company LLC, New Orleans, La.) and SPAN 85 (Aldrich Chemical Company Inc., Milwaukee, Wis.) in a 1:1 mixture by weight of ISOPAR G (ExxonMobil Lubricants & Petroleum Specialties Company) and HALOCARBON 1.8 (Halocarbon Products Corporation, River Edge, N.J.).

A second system, System B, was prepared by dispersing an organosilane treated, silica clad $TiO_2$ in the same serum as System A. Again, the mobility values were calculated using Equation 13 or Equation 14 with measured values of Q/M or conductivity respectively. The curve labeled as $\mu_B$ shows that these particles have a lower, though still increasing, mobility magnitude in comparison to the particles in System A.

The third system, System C, was prepared by dispersing a pigment (an organosilane treated, silica clad $TiO_2$ with a polymer shell) in a solution of SOLSPERSE 17000 (Avecia, Inc., Wilmington, Del.) and SPAN 85 (Aldrich Chemical Company Inc.) in a 1:1 mixture by weight of ISOPAR G (ExxonMobil Lubricants & Petroleum Specialties Company) and HALOCARBON 1.8 (Halocarbon Products Corporation). The curve labeled as $\mu_C$ shows that these particles have a constant, negative polarity mobility over the range of fields applied.

While the invention has been particularly shown and described with reference to specific preferred embodiments, it should be understood by those skilled in the art that various changes in form and detail may be made therein without departing from the spirit and scope of the invention as defined by the appended claims. For example, an image pixel may include more than four types of particles.

What is claimed is:

1. An electrophoretic display having a viewing surface, the display comprising:
   an image pixel comprising:
      a first plurality of particles having a first mobility, $\mu_1(V)$; and
      a second plurality of particles having a second mobility, $\mu_2(V)$, at least one of the first and second mobilities varying with the addressing voltage V applied to the pixel such that at a first addressing voltage $V_1$:

$$\mu_1(V_1) > \mu_2(V_1)$$

whereas at a second addressing voltage $V_2$:

$$\mu_2(V_2) > \mu_1(V_2)$$

whereby the image pixel can produce a first optical state determined by a motion of the first plurality of particles by application of the first addressing voltage $V_1$ and a second optical state determined by a motion of the second plurality of particles by application of the second addressing voltage $V_2$.

2. The electrophoretic display of claim 1 wherein the image pixel further comprises a carrier medium, and the first plurality of particles and the second plurality of particles are disposed in the carrier medium.

3. The electrophoretic display of claim 1 further comprising an addressing voltage generator in electrical communication with the image pixel.

4. The electrophoretic display of claim 1 wherein the image pixel further comprises a third plurality of particles having a third mobility, $\mu_3(V)$, such that the following relationships are satisfied at the first and second addressing voltages $V_1$ and $V_2$ and at a third addressing voltage $V_3$:

$$\mu_1(V_1) > \mu_3(V_1)$$

$$\mu_2(V_2) > \mu_3(V_1)$$

$$\mu_3(V_3) > \mu_1(V_3)$$

$$\mu_3(V_3) > \mu_2(V_3)$$

whereby the image pixel can produce a third optical state determined by a motion of the third plurality of particles by application of the third addressing voltage, $V_3$.

5. The electrophoretic display of claim 4 wherein the first, second and third pluralities of particles respectively have a first, a second and a third color to permit production of a color image by the electrophoretic display.

6. The electrophoretic display of claim 4 wherein the first, second and third pluralities of particles respectively have a first, a second and a third grey level to permit display of at least three grey levels by the image element.

7. The electrophoretic display of claim 1 wherein the image pixel further comprises one or more capsules that encapsulate the carrier medium.

8. The electrophoretic display of claim 1 wherein the first plurality of particles have a charge that is a function of the addressing voltage.

9. The electrophoretic display of claim 2 wherein the carrier medium has a viscosity that is a function of a motion of the first plurality of particles.

10. The electrophoretic display of claim 1 wherein the carrier medium has a viscosity that is a function of the addressing voltage.

11. The electrophoretic display of claim 1 wherein the image pixel further comprises a third plurality of particles having a third mobility, $\mu_3(V)$ such that the following relationships are satisfied:

$$|\mu_3(V)| < |\mu_1(V)| \text{ and}$$

$$|\mu_3(V)| < |\mu_2(V)|$$

for all addressing voltages, V, whereby the image pixel can produce a third optical state by application of a third addressing voltage, $V_3$, that causes a motion of the first and second pluralities of particles away from the viewing surface.

12. The electrophoretic display of claim 11 wherein $\mu_3(V)$ is a constant independent of voltage.

13. The electrophoretic display of claim 11 wherein $\mu_3(V)$ has a polarity that is the same as both the polarity of $\mu_1(V)$ and the polarity of $\mu_2(V)$.

14. The electrophoretic display of claim 11 wherein $\mu_3(V)$ has a polarity that is opposite to both the polarity of $\mu_1(V)$ and the polarity of $\mu_2(V)$.

15. A method of forming an image in an electrophoretic display having a viewing surface, the method comprising the steps of:

providing an image pixel comprising a first plurality of particles having a first mobility, $\mu_1(V)$; and a second plurality of particles having a second mobility, $\mu_2(V)$, at least one of the first and second mobilities varying with the addressing voltage V applied to the pixel such that at a first addressing voltage $V_1$:

$$\mu_1(V_1) > \mu_2(V_1)$$

whereas at a second addressing voltage $V_2$:

$$\mu_1(V_2) < \mu_2(V_2)$$

addressing the image pixel with a first addressing voltage, $V_1$, to produce a first optical state determined by a motion of the first plurality of particles; and addressing the image pixel with the second addressing voltage, $V_2$, to produce a second optical state determined by a motion of the second plurality of particles.

16. The method of claim 15 further comprising addressing the image pixel with a third addressing voltage, $V_3$, of opposite polarity to both $V_1$ and $V_2$ to produce a third optical state determined by a carrier medium and due to a motion of the first and second pluralities of particles away from the viewing surface of the display.

17. The method of claim 15 wherein the image pixel further comprises a third plurality of particles having a third mobility, $\mu_3(V)$, such that the following relationships are satisfied at the first and second addressing voltages $V_1$ and $V_2$ and at a third addressing voltage $V_3$:

$$\mu_1(V_1) > \mu_3(V_1)$$

$$\mu_2(V_2) > \mu_3(V_1)$$

$$\mu_3(V_3) > \mu_1(V_3) \text{ and}$$

$$\mu_3(V_3) > \mu_2(V_3),$$

the method further comprising the step of addressing the image pixel with the third addressing voltage $V_3$ to produce a third optical state determined by a motion of the third plurality of particles.

18. The method of claim 15 wherein the first plurality of particles have a charge that is a function of the addressing voltage.

19. The method of claim 15 further comprising the step of providing a particle carrier medium having a viscosity that is a function of a motion of the first plurality of particles, the first and second pluralities of particles being disposed in the particle carrier medium.

20. The method of claim 15 further comprising the step of providing a particle carrier medium having a viscosity that is a function of voltage, the first and second pluralities of particles being disposed in the particle carrier medium.

21. The method of claim 15 wherein the image pixel further comprises a third plurality of particles having a third mobility, $\mu_3(V)$ such that:

$$|\mu_3(V)| < |\mu_1(V)| \text{ and}$$

$$|\mu_3(V)| < |\mu_2(V)|$$

for all addressing voltages, V, the method further comprising addressing the image pixel with a third addressing voltage, $V_3$, to produce a third optical state determined by a motion of the first and second pluralities of particles away from the viewing surface.

* * * * *